United States Patent [19]

Rung et al.

[11] Patent Number: 4,611,839
[45] Date of Patent: Sep. 16, 1986

[54] SELF-ADJUSTING PIPE CLAMP AND COUPLING

[75] Inventors: Robert Rung, Hopatcong, N.J.; Lani G. Ache, Allentown, Pa.

[73] Assignee: Victaulic Company of America, Easton, Pa.

[21] Appl. No.: 512,934

[22] Filed: Jul. 12, 1983

[51] Int. Cl.⁴ .............................................. F16L 17/00
[52] U.S. Cl. ................................... 285/367; 285/373; 285/411; 285/419; 285/420; 24/279
[58] Field of Search .............. 285/112, 367, 373, 411, 285/419, 420, 421; 24/279

[56] References Cited

U.S. PATENT DOCUMENTS

| | | | |
|---|---|---|---|
| 48,517 | 7/1865 | Chambers | 285/419 |
| 147,837 | 2/1874 | Heginbotham | 285/419 |
| 212,547 | 2/1879 | Forbes | 285/419 |
| 314,066 | 3/1885 | Sergeant | 24/279 |
| 347,461 | 8/1886 | Bourgeral | 285/367 |
| 377,130 | 1/1888 | White | 285/411 |
| 749,465 | 1/1904 | Thorpe | 285/394 |
| 858,575 | 7/1907 | Claflin | 285/114 |
| 1,443,579 | 1/1923 | Lippincott | 285/419 |
| 1,831,641 | 11/1931 | Skinner | 285/373 |
| 1,928,316 | 9/1933 | Muto | 285/420 |
| 2,208,660 | 7/1940 | Brunelle | 285/411 |
| 2,752,173 | 6/1956 | Krooss | 285/367 |
| 2,936,186 | 5/1960 | Dummire | 285/373 |
| 3,054,629 | 9/1962 | Piatek | 285/373 |
| 3,251,615 | 5/1966 | Short, III | 285/112 |
| 3,643,986 | 2/1972 | Allan | 285/419 |
| 3,771,820 | 11/1973 | Hoss | 285/373 |
| 3,861,180 | 1/1975 | Heckrotte | 285/410 |
| 4,352,512 | 10/1982 | Janssen | 285/419 |
| 4,408,788 | 10/1983 | Beukema | 285/112 |
| 4,471,979 | 9/1984 | Gibb et al. | 285/112 |

Primary Examiner—Cornelius J. Husar
Assistant Examiner—Eric K. Nicholson
Attorney, Agent, or Firm—Abelman Frayne Rezac & Schwab

[57] ABSTRACT

A segmented coupling for use in sealing adjacent pipe ends includes coupling segments having bolting pads at their ends, the ends of the coupling segments including inclined end faces for cooperation with correspondingly inclined end faces of an adjacent coupling segment to produce self-adjustment of the coupling and rigid clamping of the pipe ends upon tightening down of the coupling.

21 Claims, 26 Drawing Figures

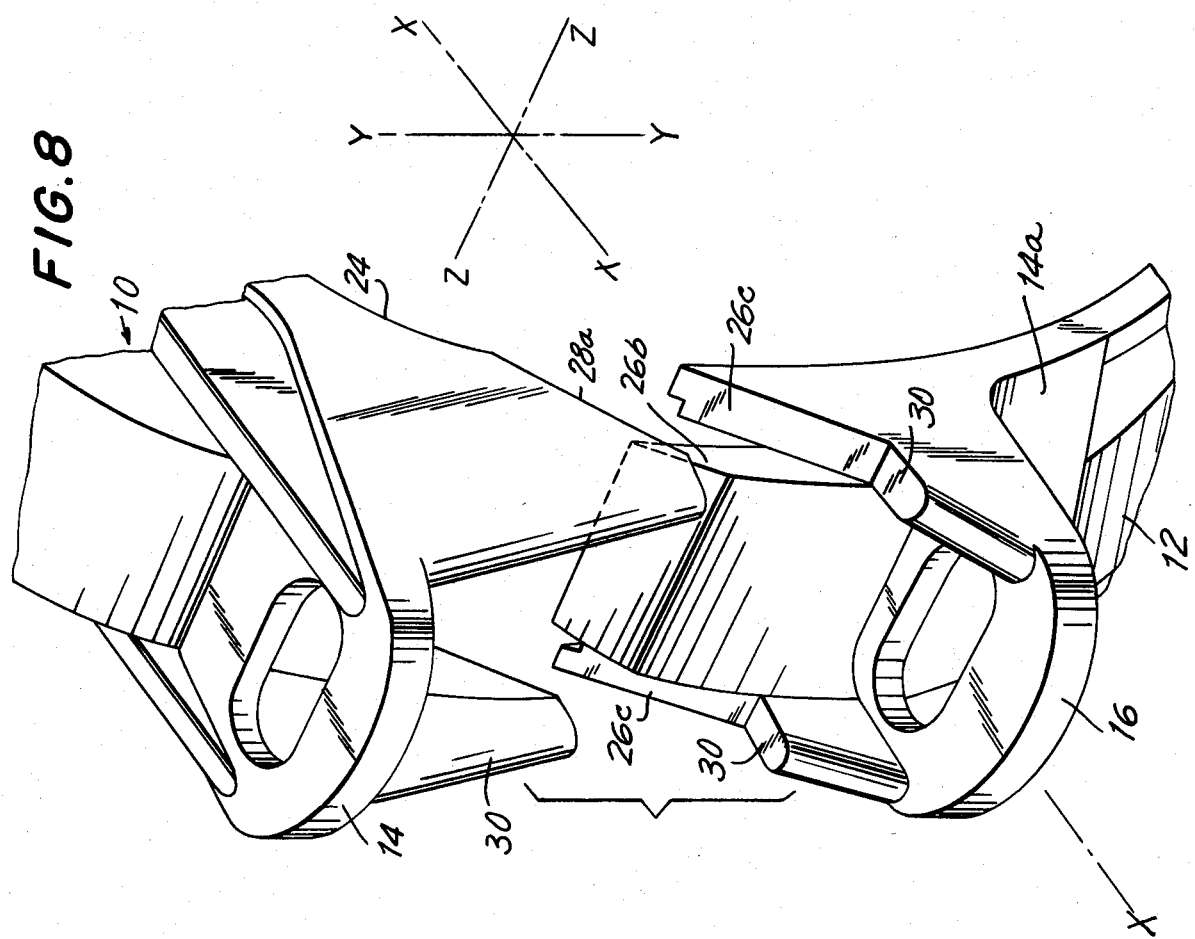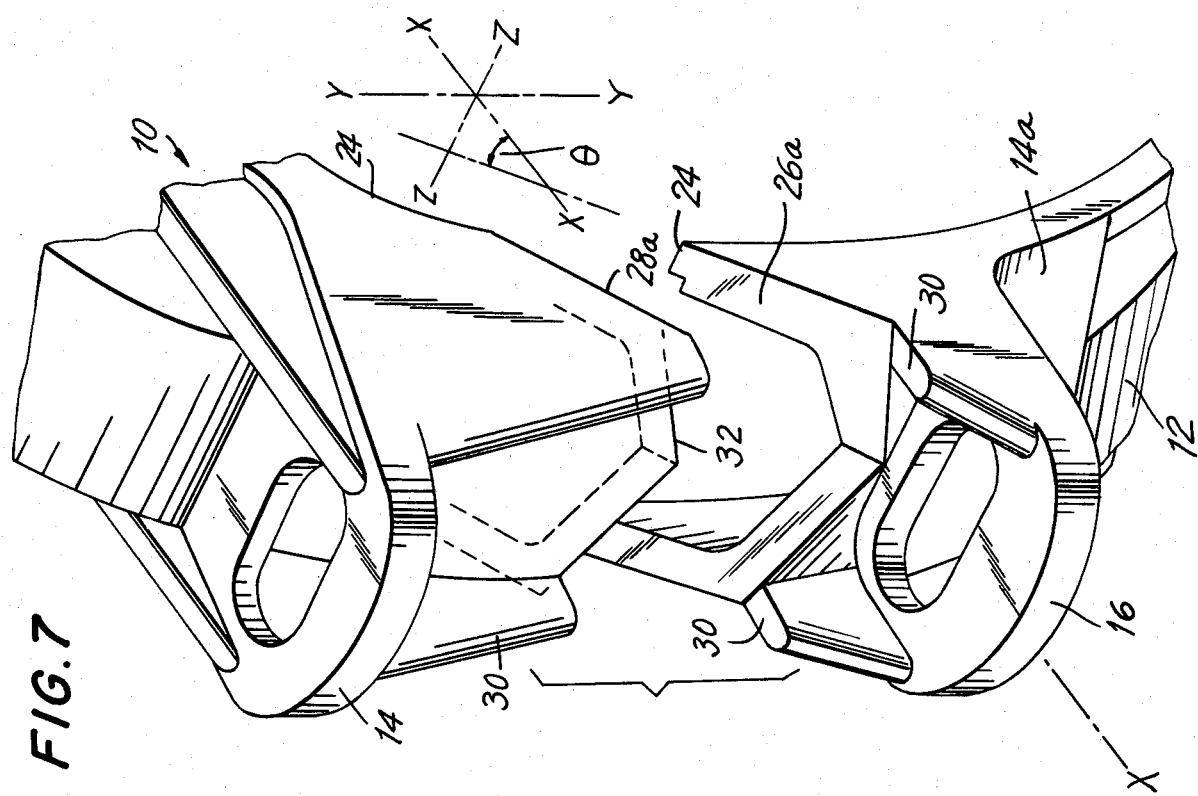

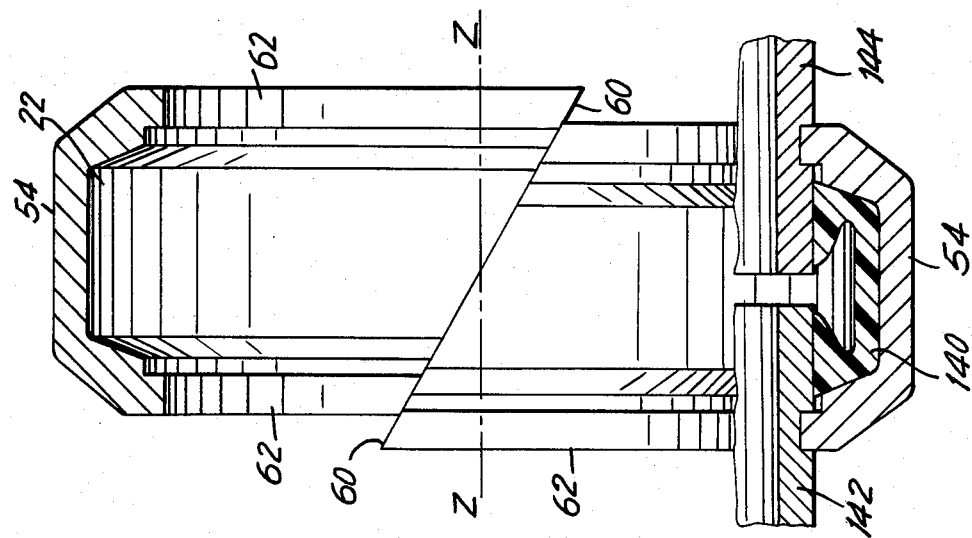
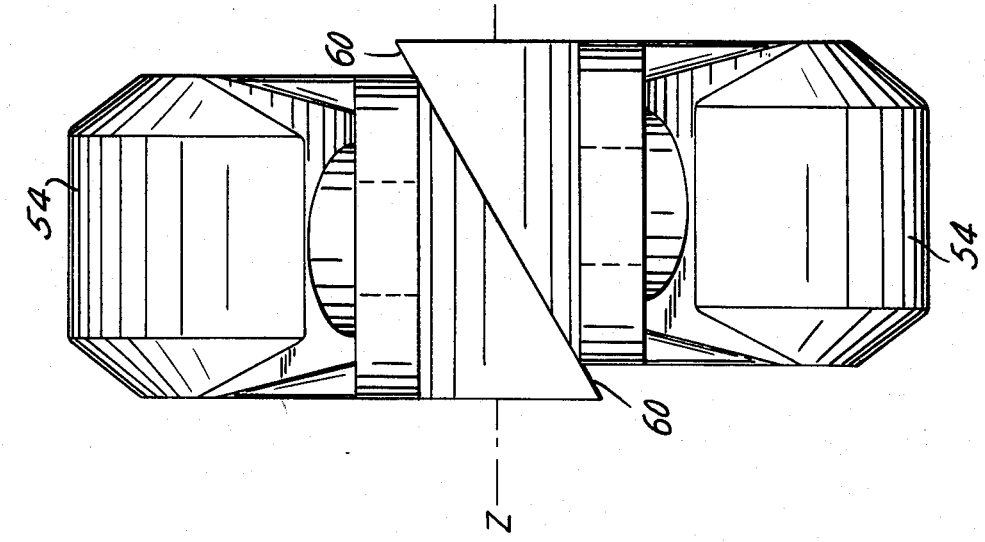
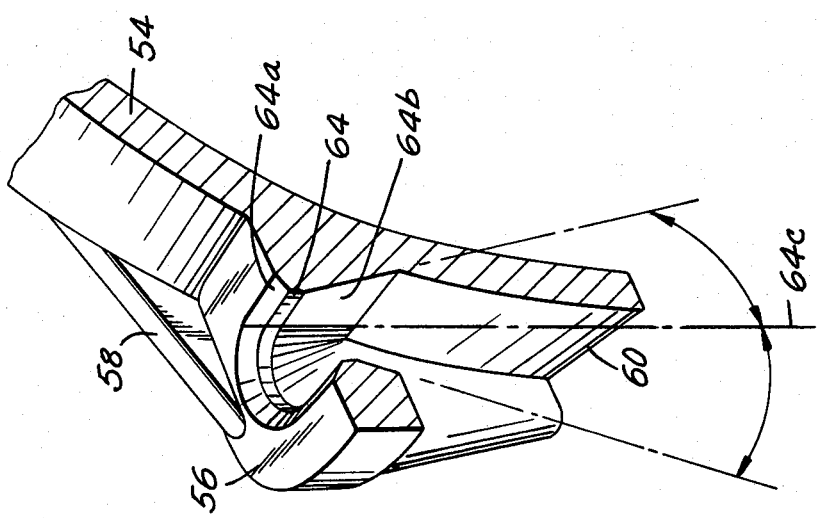

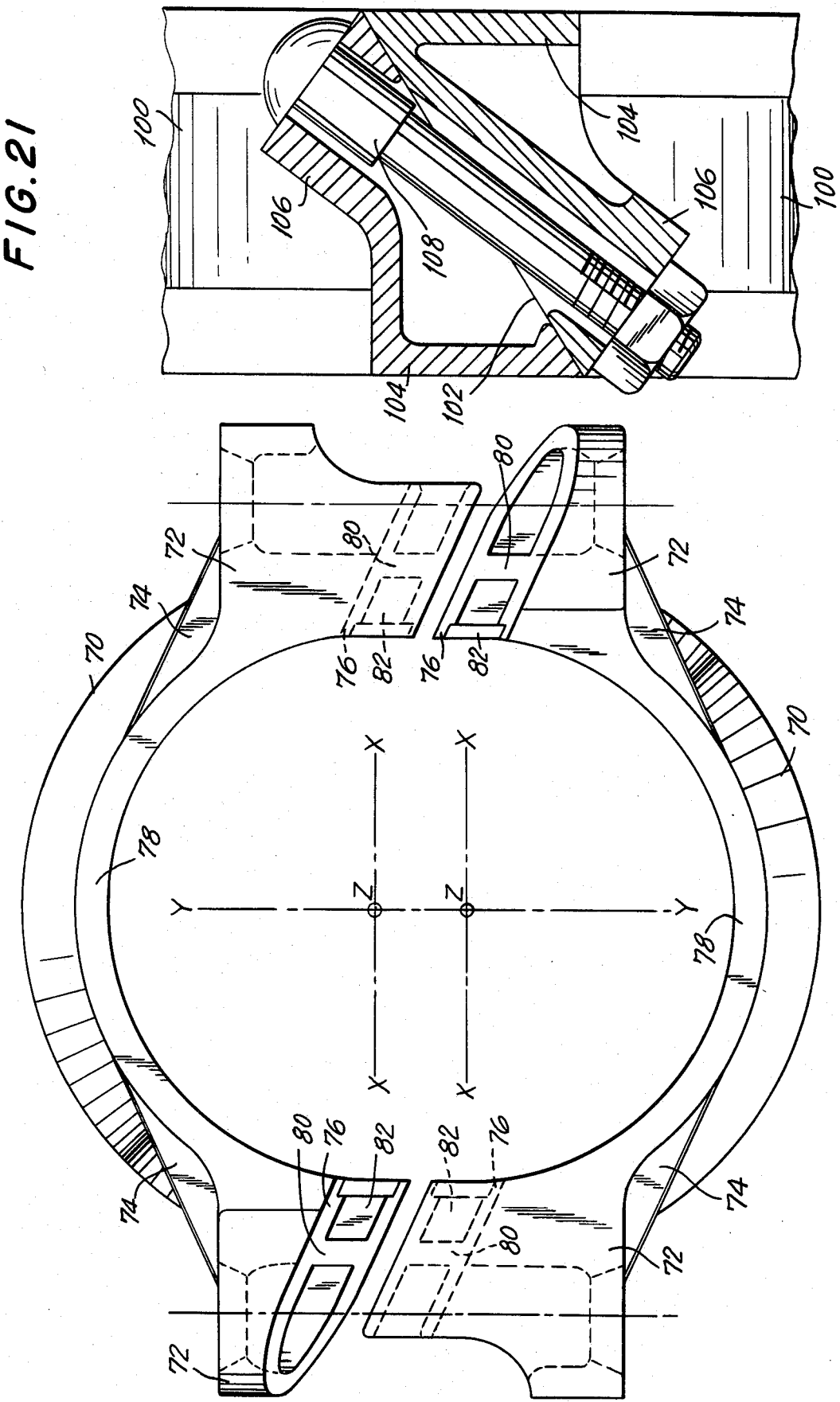

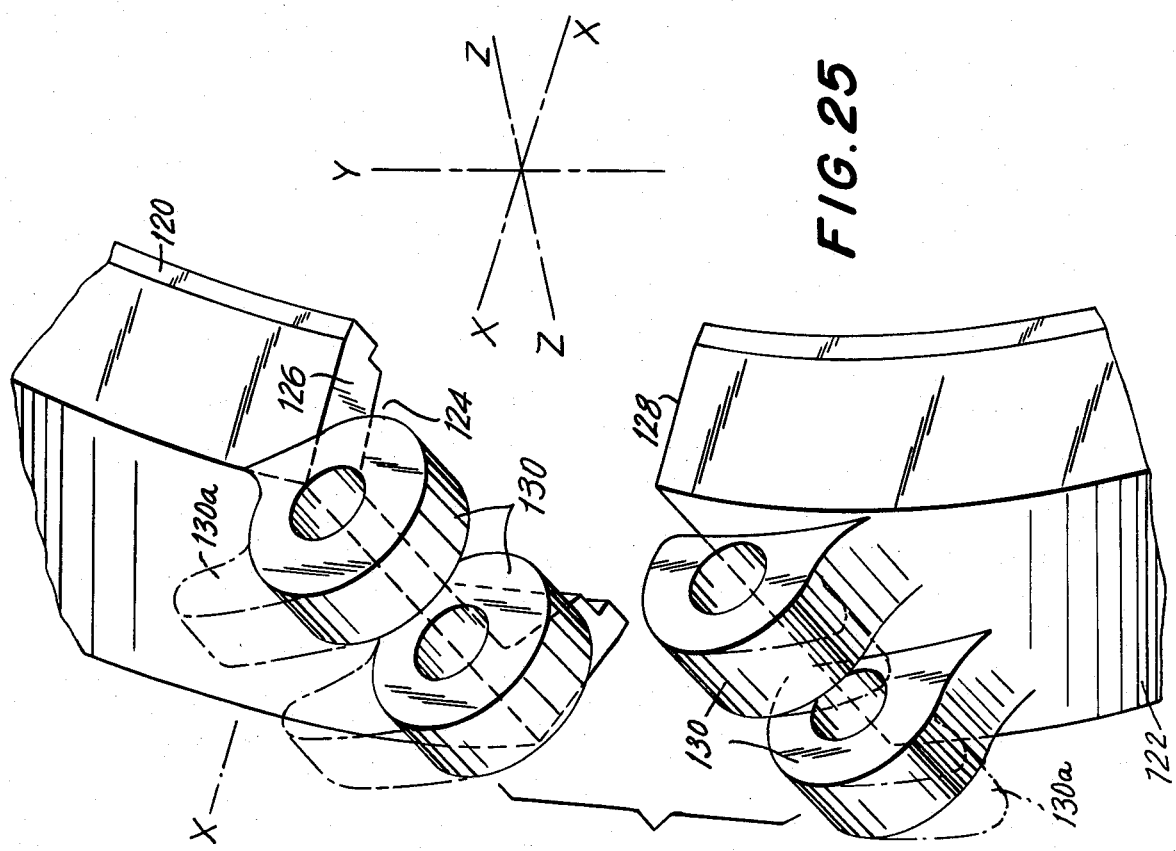
FIG.25
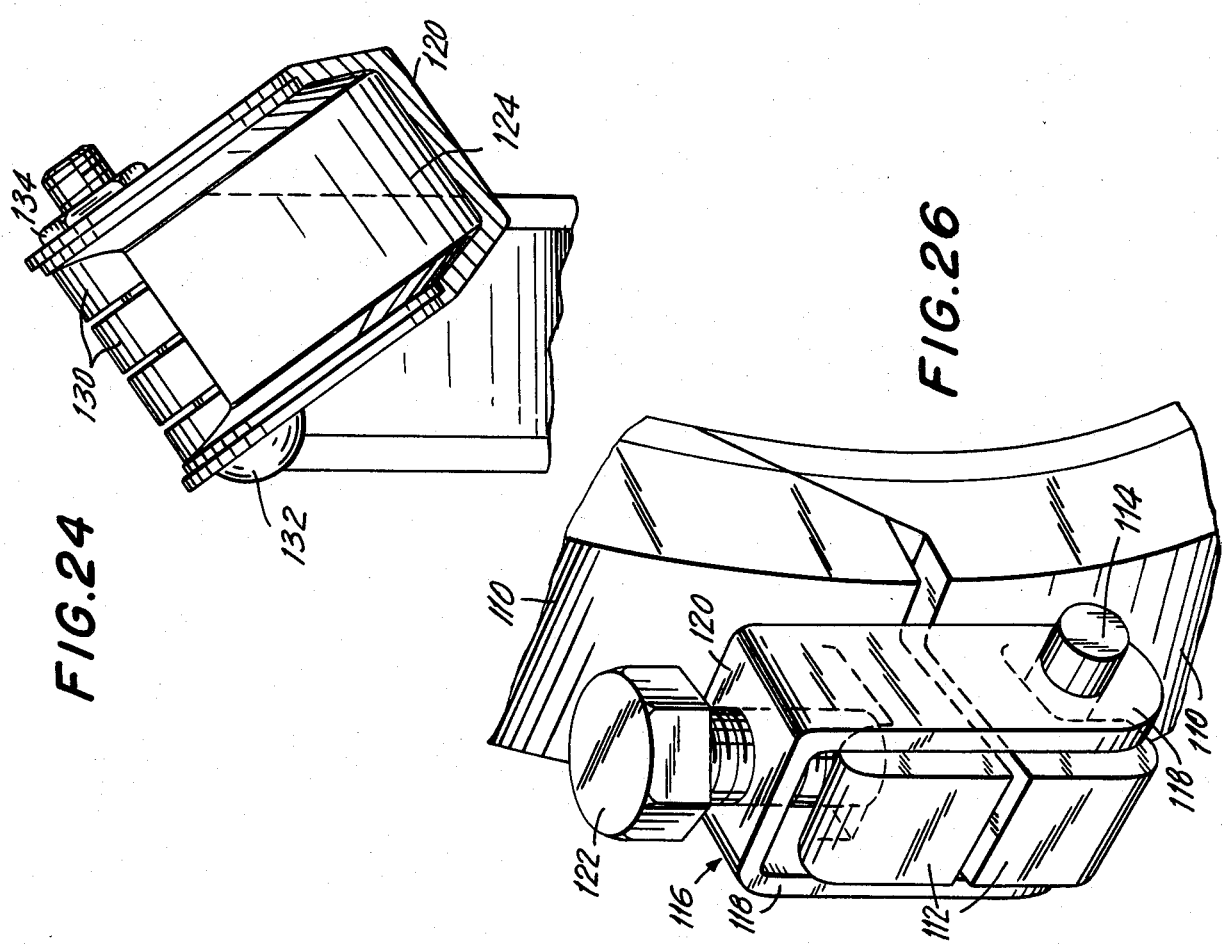
FIG.24
FIG.26

SELF-ADJUSTING PIPE CLAMP AND COUPLING

FIELD OF THE INVENTION

This invention relates to a self-adjusting segmented coupling used to connect and seal the adjacent ends of a pair of pipes, or, to join and seal a nipple of a fitting to a pipe end (hereinafter referred to as a pair of pipes). The coupling provides a substantially rigid clamp for the pipe ends to eliminate or significantly resist relative translational or rotational movement of the pipes after assembly of the coupling, despite differences in the diameter of the pipes or variations in the diameter of the cylindrical key receiving portion or in the dimensions of the coupling arising in the manufacture thereof.

BACKGROUND OF THE INVENTION

The use of segmented mechanical couplings for joining and sealing the ends of pipes has attained wide commercial acceptance, and these couplings are now employed in many industries. A typical segmented coupling is disclosed in U.S. Pat. No. 3,054,629, to Piatek, issued Sept. 18, 1962. The coupling includes a pair of arcuate coupling segments which span and embrace the adjacent ends of a pair of pipes, and which compress a sealing gasket into engagement with the external periphery at the end of pipes, (hereinafter referred to as the pipe ends). The coupling segments have keys on their inner periphery for engagement within grooves in the adjacent pipe ends, and having radially extending pads at their ends which receive bolts employed for tightening down the coupling. The keys alternatively may be engaged with external beads rolled in the pipe ends.

Optimally, when the segments are secured together, they extend in a continuous ring about the circumference of the pipe ends and substantially immobilize the pipe ends and eliminate all gaps between the segments. However, differences in the diameter of stock pipe of the same nominal diameter result in a less than optimal immobilization of the pipe ends, or gaps which permit extrusion of the contained gasket. Similar problems arise due to differences in the depth of the groove on the pipe ends. If the pipes are undersized in diameter, or the groove diameter is too small then, the bolting pads may be brought into face engagement with each other, but, the desired immobilizing clamping force on the pipe ends may not be obtained. If the pipes are oversized in diameter, or the groove diameter is too large, then the bolting pads may not be brought into face engagement with each other and may leave a gap between the bolting pads through which the gasket can extrude. To overcome these problems, relatively closely spaced apart supports or hangers have been employed to eliminate undesirable flexure at the joint, or extrusion shields have been provided to support the gaskets in the area of the gap between the bolting pads.

At least one approach to solving the first problem, that is, flexure at the joint, is addressed in Gibb et. al., U.S. patent application Ser. No. 358,361, filed Mar. 15, 1982, now Pat. No. 4,471,979, as applied to thin-walled piping which is inherently capable of moving out-of-round under compressive stresses produced by the tightening down of the coupling. Gibb et. al. teach the deliberate formation of the coupling segments for them to subtend an angle of less than 180 degress at their end faces, to permit the centers of curvature of the respective coupling segments to move beyond and to opposite sides of the diametral plane of the coupling. This selective deformation of the pipe ends by the coupling provides for rigid clamping of the coupling onto the pipe ends without regard to whether the pipes are oversized or undersized within the range of manufacturing tolerances. This construction, however, is of little utility for use with conventional pipe that is not readily deformable by a coupling, and does not eliminate the need for extrusion shields in those instances where the bolting pads do not reach face engagement with each.

U.S. Pat. No. 2,752,173, to Kroos, teaches flexure of the coupling segments to move the ends thereof in a radially inward direction for them to clamp onto pipes of less than maximum diameter within the range of manufacturing tolerances. While this will produce clamping in the diametral plane of the end faces, flexure of the coupling segments in Kroos will produce an increase in the effective length of the inner periphery of the coupling and preclude clamping of the coupling onto the pipes other than at the ends of the coupling segments. Further, in Kroos, flexure of the coupling segments results in movement of the end faces away from each other and increases the possibility of gasket extrusion.

THE INVENTIVE CONCEPT

The coupling of present invention overcomes these problems and provides a coupling which, optimally eliminates or significantly reduces any gap at the end faces of the coupling segments throughout a range of manufacturing tolerances of the pipes or of the grooves, or in the couplings, and which provides automatic adjustment of the effective length of the inner periphery of the coupling to that of the periphery of any pipe or groove having an external diameter falling within the range; and which automatically provides for self-adjustment of the coupling to bring the keys into clamping engagement with the pipes or the bottom walls of the grooves.

These advantages are provided by forming the juxtaposed end faces on at least one pair of adjacent coupling segments at an oblique angle to the diametral plane of the coupling, hereinafter defined as the diametral X-Z plane, the end faces sliding relative to each other as the coupling is tightened down for them to reduce the effective circumferential length of the inner periphery of the coupling, and thus permit the coupling to clamp onto and secure a pipe having an external diameter or groove diameters within a given range.

Preferably, the end faces of the couplings are positioned in at least closely proximal relationship to each other upon initial assembly of the coupling onto a pipe having an external diameter or groove diameter which is a maximum within a range of manufacturing tolerances. By arranging for the end faces to be in closely proximal relationship to each other, the possibility of gasket extrusion is even further reduced, even in the event that the coupling is applied to a pipe having an external diameter or groove so severely oversized that the end faces cannot meet in face engagement. In such event, an immobilizing clamping force will be applied to the pipes as the coupling is assembled, and the effective width of the gap between the end faces will be materially reduced. The angular relationship of the end faces modifies the shape of the gap to one which more readily resists extrusion of the gasket.

Various orientations of end faces are possible. For example, the end faces can either be parallel to the diametral axis of the coupling, or parallel to the pipe axis, or in any plane intermediate those planes other than being parallel to the diametral plane of the coupling.

In those embodiments where the end faces are parallel to the pipe axis the juxtaposed end faces of the coupling segments may be generally angled in the opposite or in the same directions.

In embodiments which include the opposite angling of the end faces of one of the coupling segments and complementary angled end faces at the ends of the other coupling segment, then the respective pairs of end faces will act to urge the end of one of the coupling segments inwardly to decrease the radius of that coupling segment, while simultaneously urging the ends of the other coupling segment outwardly to increase the radius of that coupling segment. In this manner, the respective coupling segments flex and permit the respective coupling segment to move into rigid clamping engagement to compensate for an oversizing, or, undersizing.

Where the angling of both end faces of one of the coupling segment is in the same direction and the angling of the other coupling segment is complementarily positioned then, lateral displacement of the coupling segments will occur in addition to the flexure of the coupling segments, thus, further assisting the rigid clamping of the coupling onto the pipe ends.

In those embodiments where the end faces of the coupling segments are parallel to the diametral axis of the coupling, the juxtaposed end faces may also be either angled in the same or opposite directions providing a coupling in which movement is permitted between the ends of the coupling segments in the direction of the axis of the pipes, then, the keys of the coupling segments are urged to respectively engage axially opposite radially extending faces of grooves in the pipe ends or beads on the exterior surface thereof, to further enhance the immobilization of the pipes against relative axial movement.

In these embodiments axial displacement will occur between the respective coupling segments as the coupling is tightened down. This reduces the effective internal circumferential length of the inner periphery of the coupling to bring the coupling into clamping engagement with the pipes. As the respective coupling segments and their keys move in opposite axial directions, the keys of one coupling segment will engage one side wall of the grooves or beads associated with the pipe ends, and the keys of the other coupling segment will engage the opposite side in order to immobilize the respective pipe ends against relative axial movement.

By providing a coupling in which the ends of the coupling segments are capable of radial movement relative to each other during tightening down of the coupling, the present invention provides a self adjusting coupling which can be brought into clamping engagement with the pipes despite oversizing or undersizing.

Whether the predominant angular direction is along the diametral plane of the coupling or along the axis of the pipe, the end faces may be other than planar and may be concave, convex, V-shaped, or of other shapes, provided that the shapes of the juxtaposed faces permit movement relative to each other. By selectively varying the shape of the end faces and the ability of the coupling segments to flex, various combinations are possible which permit adjustable seating of the segments on the pipe, both circumferentially and axially.

For convenience, the present invention has been described employing bolt pads and bolt connectors, to join the coupling segments. However, the benefits of the invention may be obtained where other means are employed for securing and tightening the coupling segments, such as hinge and toggle arrangements, circumferential straps, or the like.

To assure sufficient room for adjustment to pipe diameter when bolts and bolt pads are employed, the pads of the respective coupling segments are preferably positioned to remain spaced from each other in the finally assembled condition of the coupling.

Further, the bolt receiving apertures of the bolting pads are preferably divergent in the axial direction thereof towards the end faces. In this manner, not only can offsetting or skewing of the coupling segments during tightening down of the coupling be accommodated, but also partial assembly of the coupling can be effected prior to it being assembled onto the pipe ends.

The coupling has been illustrated as a pair of coupling segments for encircling relationship with the pipe ends. It is to be understood that a coupling of multiple coupling segments having combined arcuate lengths sufficient to provide for encircling relationship with the pipe ends may also be employed. Further the invention has been illustrated with grooved end pipe. It will be understood that the improvement in the clamping force which may be achieved in accordance with the teachings of the present invention, also has particular applicability for use in couplings designed for joining pain end pipes.

DESCRIPTION OF THE ACCOMPANYING DRAWINGS

The invention will now be described with reference to the accompanying drawings, which are illustrative of embodiments of the invention falling within the scope of the appended claims, and in which:

FIGS. 6, 7 and 8 illustrate modifications of the form and shape of the inter-engaging end faces of the bolting pad of FIG. 5;

FIG. 15 is a fragmentary perspective view of one of the bolting pads of FIGS. 12 through 14;

FIG. 16 is a side elevation of FIG. 12 showing the coupling segments assembled to each other and illustrating the permitted slippage between the coupling segments;

FIG. 17 is a section taken on the line 17—17 of FIG. 12, and illustrating the movement between the diametrically opposite pair of bolting faces;

FIG. 19 is a front elevation of two coupling segments of still another embodiment of the coupling of the present invention in position for assembly to each other;

FIG. 21 is a sectional side elevation of the coupling illustrating a modification in the orientation of the track bolts and bolting pads;

FIG. 24 illustrates the hinge of FIG. 22 when in an opened position;

FIG. 25 is an exploded prespective view of the hinge members of FIGS. 22 through 24; and, FIG. 26 is a fragmentary perspective view of a coupling, showing an alternative form of traction mechanism to be employed in substitution for the track bolts of the preceding figures.

DESCRIPTION OF THE PREFERRED EMBODIMENTS

Figure 1:
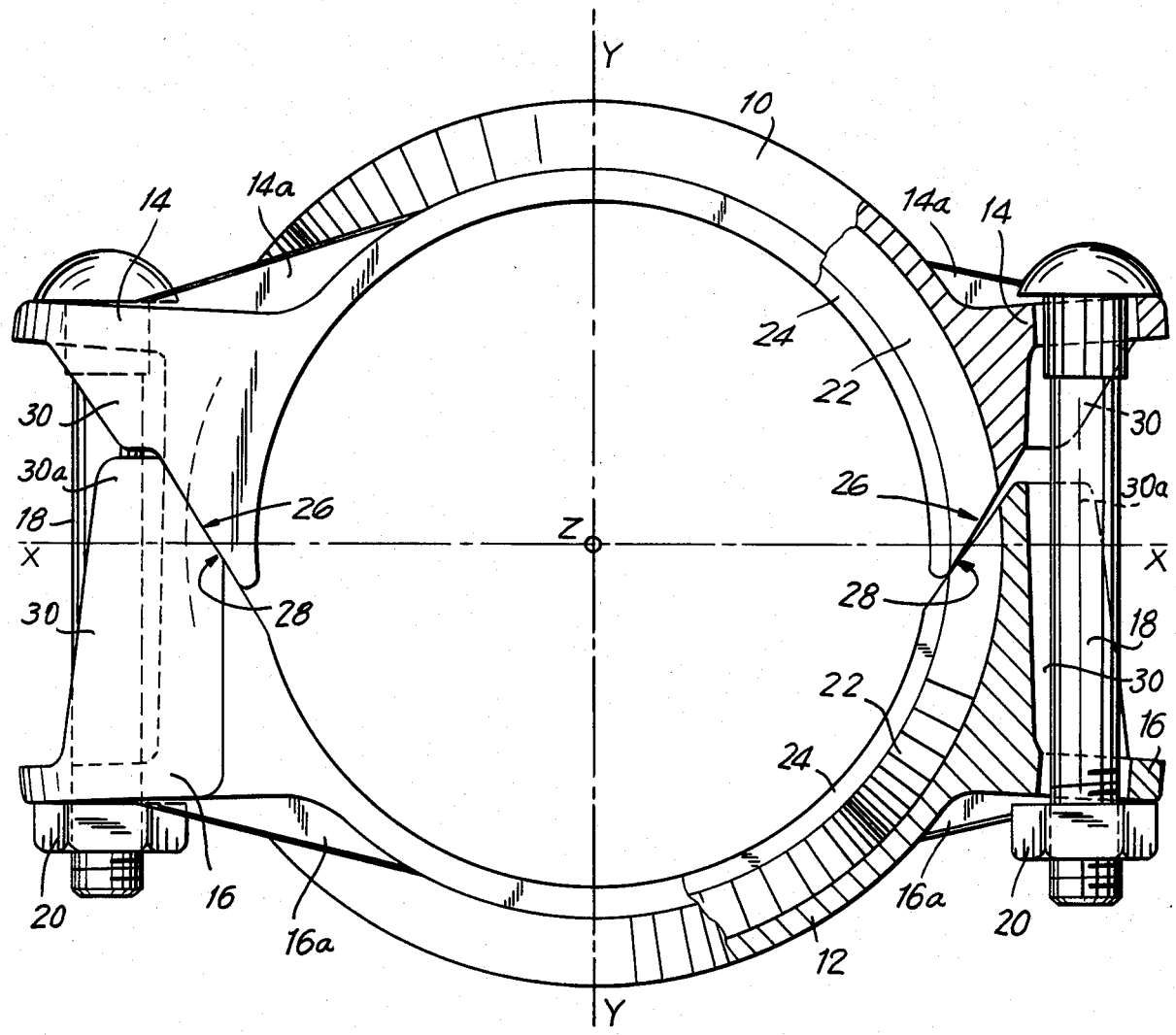
FIG. 1 is a front elevation of one form of pipe coupling of the present invention, showing the interrelationship of the coupling segments, a portion of the coupling segments having been shown in section for clarity of illustration.
Figure 2:
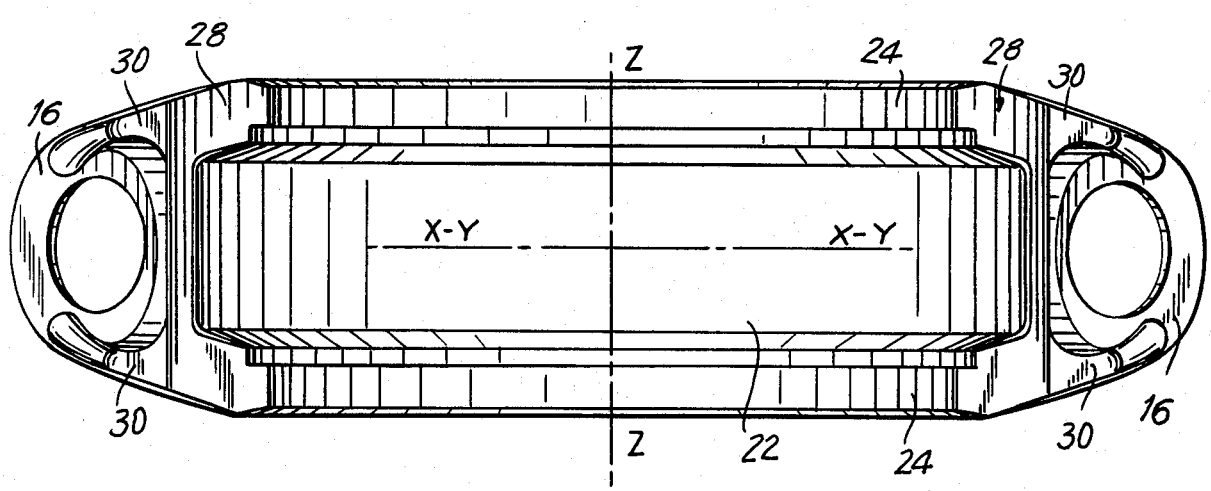
FIG. 2 is a top plan view of the lowermost coupling segment shown in FIG. 1.

Referring now to FIGS. 1 and 2, the coupling, as is conventional, is illustrated as comprised of two identical coupling segments, 10 and 12, having outwardly extending bolting pads 14 and 16 which are suitably apertured to receive track bolts 18. The bolts 18 extend through the respective pairs of the bolting pads, and carry nuts 20 which are employed for the tightening down of the coupling.

The coupling segments 10 and 12 are provided with an internal gasket receiving channel 22, (the gasket being omitted for the sake of clarity). The gasket, as is well known in the art, may either be a continuous gasket which is slipped over the ends of the pipes and brought into a bridging relationship therewith, or, it may be a split gasket which is wrapped around the pipes in a bridging relationship with the ends thereof, or, the gasket may be comprised by gasket segments. Preferably, in those instances in which a split gasket or gasket segments are employed, the radial end faces thereof are located at a position spaced circumferentially from the faces of the bolting pads. In instances in which gasket segments are employed, preferably they are secured to the associated coupling segments, for example, by an adhesive.

On each side of the gasket receiving channel of 22, the coupling segments are formed with radially inwardly extending keys 24, which are received in grooves (not shown) in the pipe ends. Alternatively, (not shown) the keys may be engaged behind radially outwardly extending beads or other projections formed on or secured to the exterior periphery of the pipe ends.

The coupling segment 10 terminates at its ends in inclined end faces 26, and, the coupling segment 12 terminates in inclined end faces 28.

In the following description, and in the appended claims, the orientations of the end faces of the couplings and the directions in which they are inclined are defined by reference to the respective axes and planes of coupling, which are summarized as follow:

the X axis is an axis related to the end faces of the coupling segments, and is an axis extending through the line of generation of the radii of the respective coupling segments. Within minor variations, the X axis includes and passes through the center of the assembled coupling, or provides a bisector of a line extending between the lines of generation of the radii of the respective coupling segments. For convenience of illustration, the X axis has been illustrated in a horizontal orientation. It will, however, be appreciated that the X axis may be in any orientation in actual use of the coupling;

the Y axis is an axis extending through the line of generation of the radii of the respective coupling segments, and which is perpendicular to the X axis;

the X-Y plane is a plane including both the X axis and the Y axis, and which thus is perpendicular to the pipe axis;

the Z axis generally corresponds to the pipe axis, and is the longitudinal axis of the coupling which extends through the point of intersection of the X axis and the Y axis, the Z axis thus extending perpendicular to the X-Y plane;

the X-Z plane is a diametral plane which includes both the X axis and the Z axis;

the Y-Z plane extends perpendicular to the X-Z plane and includes both the Y axis and the Z axis.

These axes are illustrated in FIGS. 1 and 2 of the drawings, and in others of the drawings to provide visual reference to those axes and the positioning of the respective X-Y, Y-Z and Z-X planes.

In FIGS. 1 and 2, the respective pairs of end faces each extend parallel to the Z axis and are each inclined at opposite oblique angles with respect to the horizontal diametral X-Z plane extending through the coupling, the end faces 26 defining male members extending from the ends of the coupling segment 10, and the end faces 28 defining female members extending inwardly of the coupling segment 12.

The bolting pads 14, 16 of the respective coupling segments 10 and 12 are provided with reinforcing flanges or buttresses 30, which transfer the cantilever loading exerted on the bolting pads 14, 16 by the track bolts 18 directly to the ends of the coupling segments 10 and 12.

While various angles are suitable, the end faces 26 and 28 of FIGS. 1 and 2 are arranged at an angle of approximately 60 degrees to the horizontal diametral X-Z plane, and preferably at a slight included angle to each other, for example, in the order of 6 degrees, in order that the end faces diverge from each other in a radially outward direction. Further, the bolting pads 14, 16 may be positioned at a slight included angle of about 3 degrees to the horizontal diametral plane X-Z for them to assist in sliding the end faces 26, 28 relative to each other, and the progressive closing of any gap existing between the end faces.

Upon initial positioning of the segments, a minor gap will be present between the end faces 26 and 28 at positions radially outwardly of the line of inter-engagement of the faces. The existing gap will narrow as the coupling is tightened down until the respective end faces 26 and 28 are substantially in face engagement with each other. The tightening down of the bolts 18 will cause the end faces 26 and 28 to slide relative to each other, the end faces 26 sliding downwardly relative to the end faces 28, and, the end faces 28 sliding upwardly relative to the end faces 26.

As a result, the end faces 26 act to force the respective end faces 28 radially outwardly with a wedging action to flex the coupling segment 12 and increase the effective radius thereof. Simultaneously, the respective end faces 28 act to force the end faces 26 radially inwardly to decrease the effective radius of the coupling segment 10.

The coupling segment 10 is thereby drawn downwardly into clamping engagement with the pipes (not shown), while simultaneously the ends of the coupling segment 10 are forced radially inwardly into clamping engagement with the pipes. The coupling segment 12 is drawn upwardly into clamping engagement with the pipes, and, the respective pairs of faces are moved into parallelism with each other for them to imprison the gasket and prevent extrusion thereof.

Due to the radially outward movement of the ends of the coupling segment 12, the end faces 28 of the coupling segment 12 progressively move into parallelism and face contact with the end faces 26, ultimately resulting in the closure or the near complete closure of the gap between the respective pairs of end faces 26 and 28.

The respective sliding actions and the flexure of the coupling segments accompanied by the closure of the gap between the bolting faces 26, 28, will in turn produce movement of the bolting pads 14, 16 towards parallelism with each other and produce full seating of the heads of the track bolts 18 and the nuts 20.

As will be appreciated, each of these movements occurs concurrently and in combination upon the tightening down of the coupling. While the combined movements may possibly reposition those portions of the end faces 26 and 28 which bridge the gasket receiving channel 22 out of circumferential alignment with each other, there are no adverse consequences and in the fully tightened down position of the coupling the bridging portions remain overlapped in the radial direction.

By the provision of the reinforcing flanges or buttresses 30 proximate the bolting pads 14, and 16 and the orientation of the supplemental buttresses 14a, 16a for them to extend substantially tangentially between the body of the coupling segments 10 and 12 and the respective bolting pads 14 and 16, flexure of the respective coupling segments 10 and 12 at the ends thereof is minimized, and is limited dominantly to the central arcuate portion of the coupling segments.

As the respective end faces 26 and 28 are free to slide relatively to each other with the coupling segments 10 and 12 capable of moving towards to each other in the direction of the vertical Y axis, the effective circumferential length of the inner periphery of the coupling can be decreased as required in order for the keys 24 of both of the coupling segments 10 and 12 to move into substantially continuous clamping line engagement with the pipe periphery, or, with the bottom of the grooves in the pipe ends. The respective coupling segments will move through a position in which their inner peripheries lie on a circle, to a position in which the respective coupling segments 10 and 12 define intersecting arcs. While this may result in a slight distortion of the pipe ends from a condition in which they are truly round, it also acts to improve the rigidity of inter connection and support of the pipes.

Figure 3:
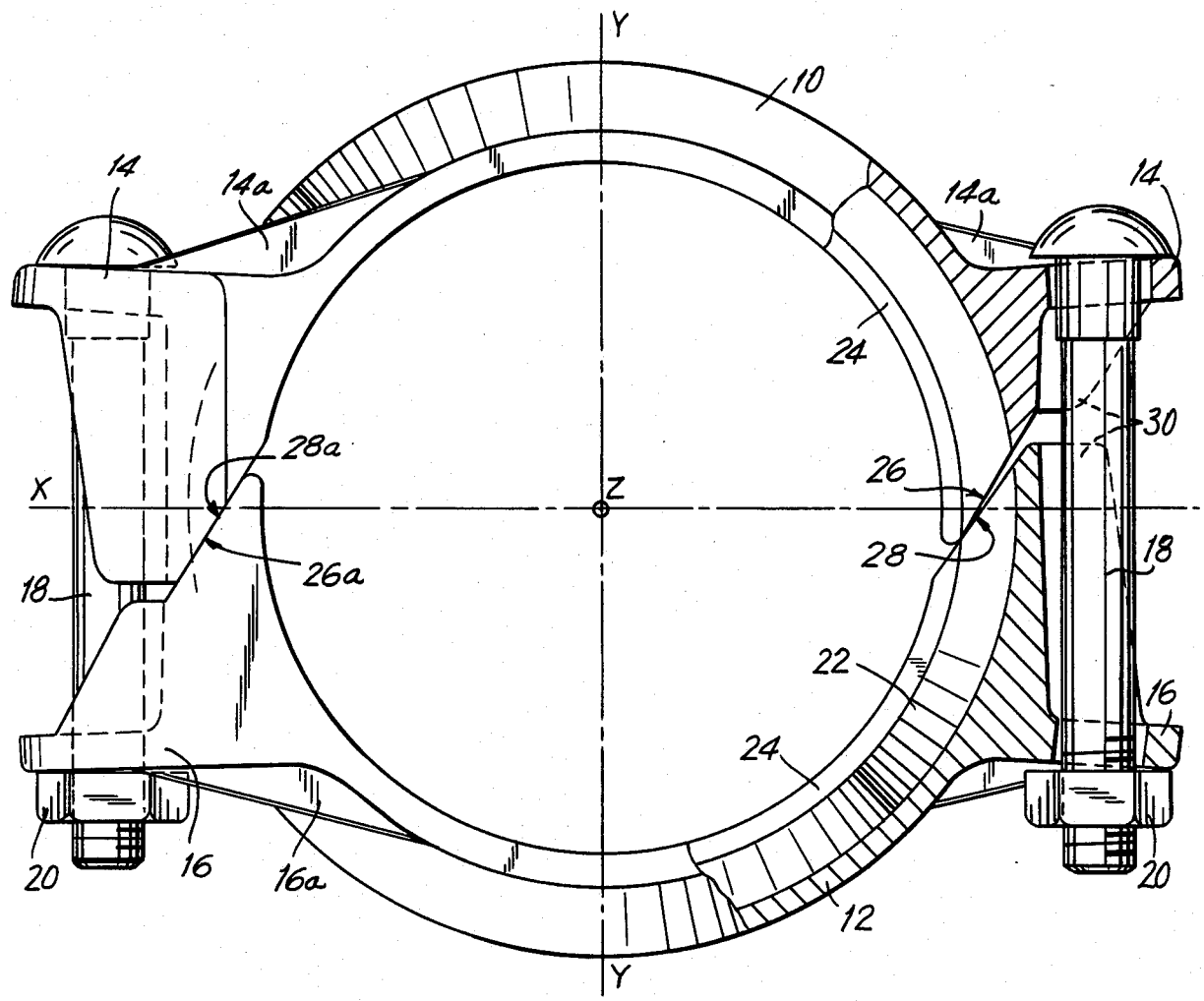
FIG. 3 is a front elevation of another form of pipe coupling of the present invention, a portion of the coupling segments being shown in section for clarity of illustration.
Figure 4:
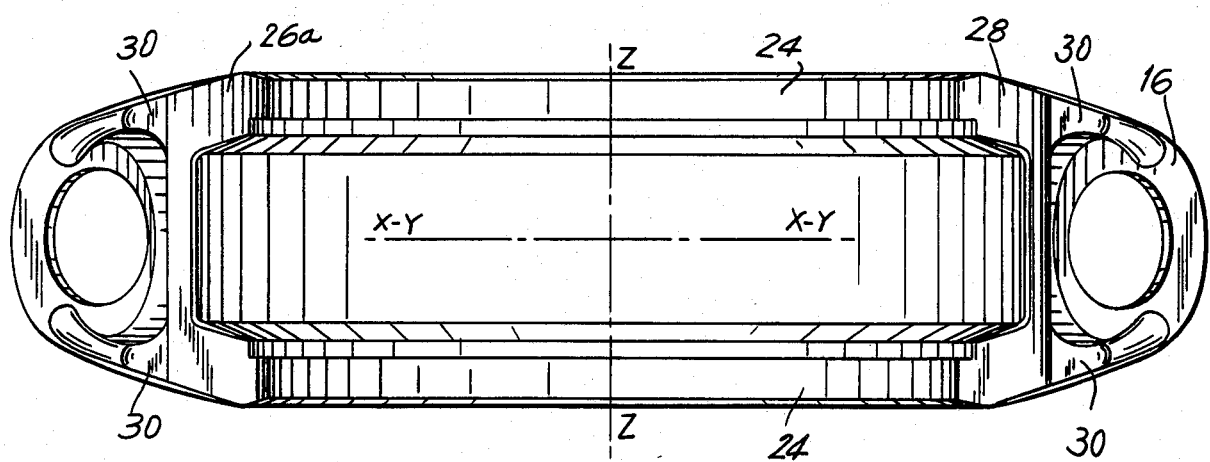
FIG. 4 is a top plan view of the lowermost coupling segment of FIG. 3.

Referring now to FIGS. 3 and 4, the same reference numerals are used as those used in FIGS. 1 and 2 to indicate those members which are in common with FIGS. 1 and 2. In FIGS. 3 and 4, the bolting pads 14, 16 at one side (the left) of the coupling have been interchanged and thus the angle of the associated end faces 28 and 26, identified in FIG. 3 as 26a and 28a, has been reversed. The respective coupling segments 10 and 12 are otherwise closely similar in all respects with the coupling segments 10 and 12 of FIGS. 1 and 2.

By repositioning the bolting pads 14 and 16, and thus repositioning the end faces 26a and 28a as shown in FIGS. 3 and 4, an increase in the permissable extent of the movement of the coupling segments 10 and 12 towards each other is obtained, accompanied by a lateral shifting in opposite directions of the respective coupling segments 10 and 12 in directions substantially parallel to the horizontal X axis.

In this embodiment, tightening down of the track bolts 18 will initially result in a leftward movement of the coupling segment 10, and a corresponding rightward movement of the coupling segment 12. This will bring the male projection defining the end face 26 at the righthand side of the coupling member 10 into clamping engagement with the exterior of the pipes, at which point it will be substantially immobilized, and similarly, will bring the male projection defining the end face 26a at the lefthand side of the coupling segment 12 into clamping engagement with the exterior of the pipes, at which point it similarly will become substantially immobilized.

On the continuance of the tightening down of the bolts 18, the respective bolting pads 14, 16 will move towards parallelism to flex the respective coupling segments, and the respective end faces 28 and 28a will slide up the immobilized end faces 26 and 26a, and bring the respective pairs of end faces 26, 28 and 26a, 28a into parallelism and face engagement. At the same time the effective circumferential length of the inner periphery of the coupling is decreased to bring the keys 24 of the respective coupling segments into clamping engagement with the peripheries of the pipe ends or the bottoms of the grooves therein.

By decreasing the effective circumferential length of the inner periphery of the coupling, accompanied by some possible flexure and ovalling of the pipe end, clamping engagement is obtained throughout substantially the entire periphery of the pipe end, while at the same time, the respective end faces move into parallelism and face engagement with each other to obviate the possible extrusion of the contained gasket when under pressure loading.

Figure 5:
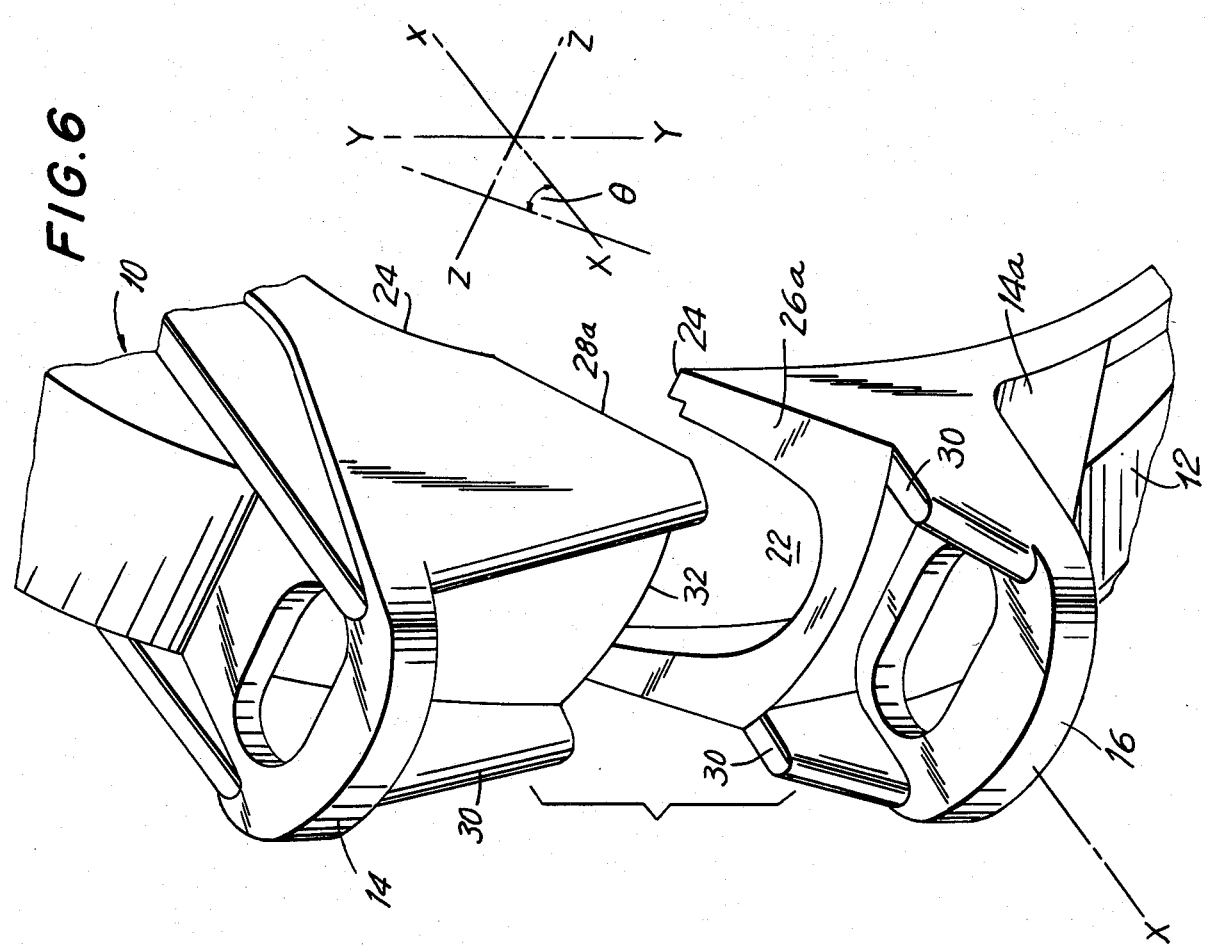
FIG. 5 is a fragmentary perspective view of a bolting pad in accordance with FIGS. 1 through 4.

Referring now to FIG. 5, the ends of the coupling segments illustrated at the left hand side of FIG. 3 are shown in exploded perspective view. In FIG. 5, the respective end faces 26a, 28a extend parallel to the Z axis, and are arranged at an oblique angle to the X-Z plane. As the coupling is tightened down, the end face 28a will progressively move down the end face 26a, with the bridging portions of the end faces 26a and 28a moving into face engagement with each other to confine and imprison a gasket (not shown) located within the coupling segments 10 and 12.

In the embodiments of FIGS. 1 through 5, the engagement of the keys 24 within the grooves of the pipe ends is utilized to align the respective coupling segments. If axial misalignment or offsetting of the bolting pads occurs, then, there is a possibility of distortion of the contained gasket at the plane of contact between the end faces, with possible lifting of the edges of the sealing gasket from their face contact with the outer periphery of the pipe ends.

Figure 6:
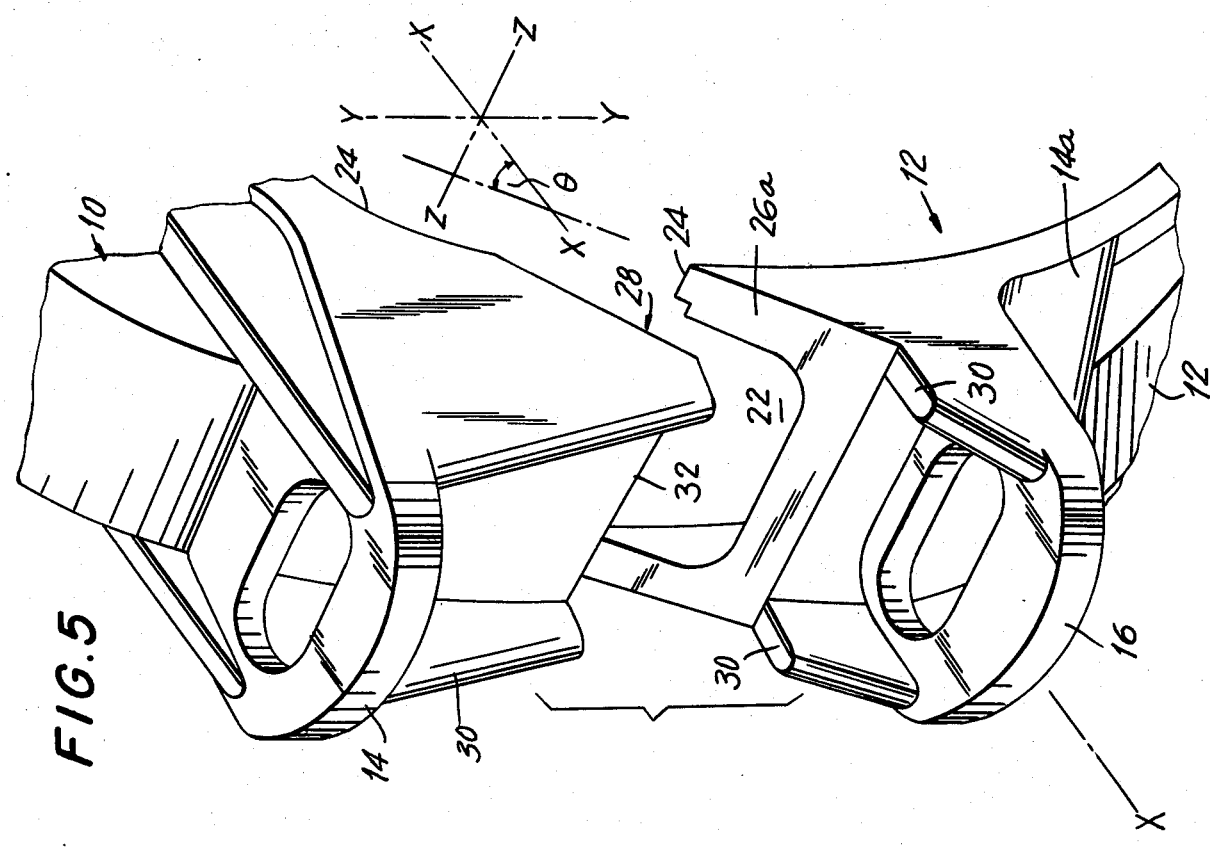

To eliminate this possibility, the respective end faces can be formed as illustrated in FIGS. 6 and 7. In FIG. 6, the end face 28a is formed for it to be convex, and, the end face 26a is formed for it to be concave. This results in the respective end faces being in the form of surfaces of a cylindrical section having its axis extending in the diametral X-Y plane and at an oblique angle to the X axis and, produces a centering action upon initial assembly of the respective coupling segments to each other. As the respective surfaces are sections of a cylinder, the respective end faces are free to move relative to each other in the X-Y plane, but are restrained or precluded from moving laterally in the direction of the Z axis and becoming offset relative to each other.

While in FIGS. 5 and 6 the end faces have been shown as being formed, respectively, as a line parallel to the Z axis and a curve having its center lying in the X-Y plane, the respective profiles being translated along a line oblique to the X axis, it will be appreciated that the end faces 26 and 28 may take other forms. Instead of being formed by a straight or a curved profile translated along an axis oblique to the X axis and lying in the X-Y plane, the profile could be translated along a curved line lying in the X-Y plane, as illustrated diagrammatically in FIG. 6. Also, instead of being comprised of a straight line or curve, the profile could be comprised of a combination of straight lines, curves, or straight lines and curves, to provide end faces that are of saw tooth, wave form, castellated, crenellated, or formed of dihedrals. Such a non-linear profile greatly reduces the possibility of sabotage attempts on the contained gasket by forcing a knife blade or other sharp instrument between the end faces and cutting or puncturing the gasket.

FIG. 7 illustrates one such embodiment, in which the respective end faces 26a and 28a are formed as dihedrals which converge downwardly towards each other in V-shape. Such a V-shape arrangement of the end faces again retrains or precludes lateral movement or offsetting of the end faces, while at the same time permitting sliding movement of the end faces relative to each other in the direction of the X-Y plane of the coupling.

Referring to FIG. 8, there is shown a modification of the bolting pads 14, 16 of FIGS. 5, 6 and 7. In FIG. 8, the end face 26a is replaced by a tongue 26b which extends beyond the end of the coupling segment 12, and which is flanked by inclined end face portions 26c. The coupling segment 10 is configured for it to be of a complementary form, such that the tongue 26b inter-fits and is received between the buttresses 30 of the bolting pad 16, and fills a recess formed in the bolting pad 16 to provide a continuation of the axial wall of the gasket-containing channel 22. The end of tongue 26b is shown as extending parallel to the Z axis and is axially straight. The end of the tongue 26b could be of other configurations, such as saw-tooth, wave-form, castellated or crenellated, again for the purpose of minimizing the possibility of sabotage attempts on the contained gasket.

Figure 9:
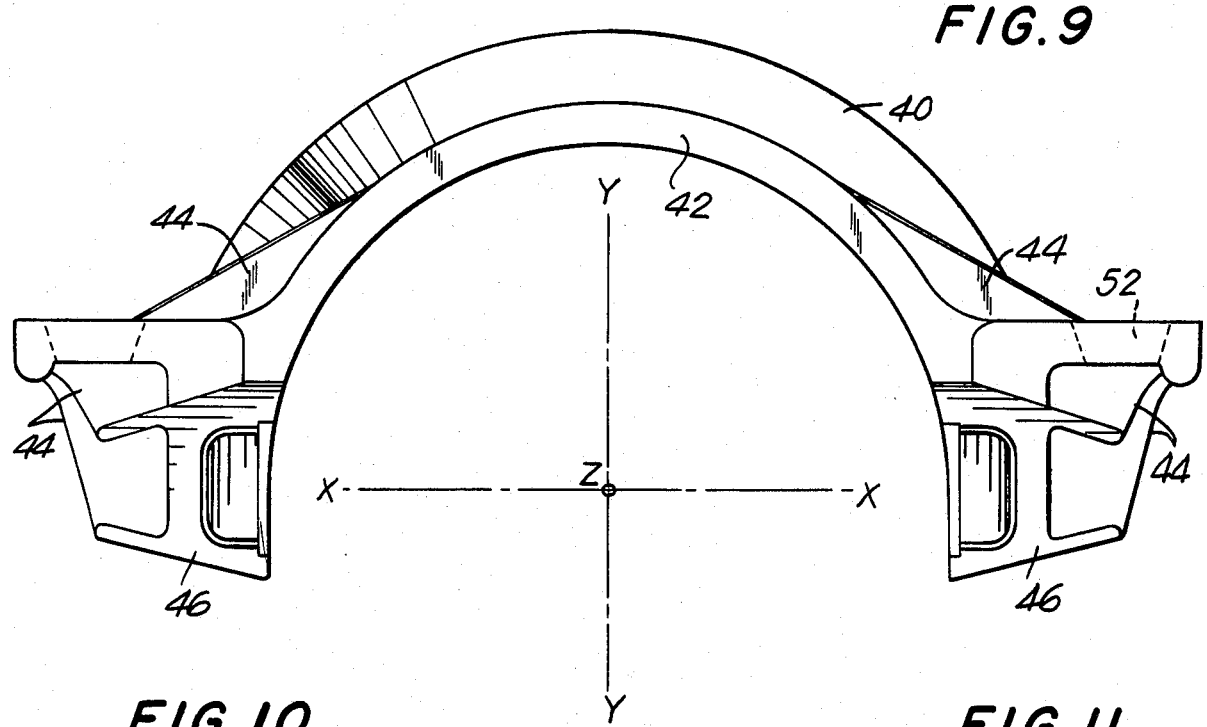
FIG. 9 is a front elevation of another form of coupling segment of the present invention, to be used in a combination with an identical coupling segment to provide a pipe coupling.

Referring now to FIG. 9, there is shown a coupling segment 40 which is to be assembled with an identical coupling segment to provide a split coupling. In this embodiment, axial movement or offsetting of the respective bolting pads in the direction of the Z axis is intentionally permitted in order to obtain a reduction in the effective circumferential length of the inner periphery of the coupling, and to permit the coupling to clamp onto and secure pipes having an external diameter within a range of tolerances of such pipes.

In FIG. 9, the coupling segment 40 is provided with bolting pads 42 at its respective ends, the respective bolting pads including reinforcing flanges or buttresses 44 for the purpose of controlling flexing and bending of the bolting pads. The end faces 46 of the coupling segment are co-planar with each other, and extend at an oblique angle of approximately 30 degrees to the diametral X-Z plane of the coupling and perpendicular to the Y-Z plane.

Figure 10:
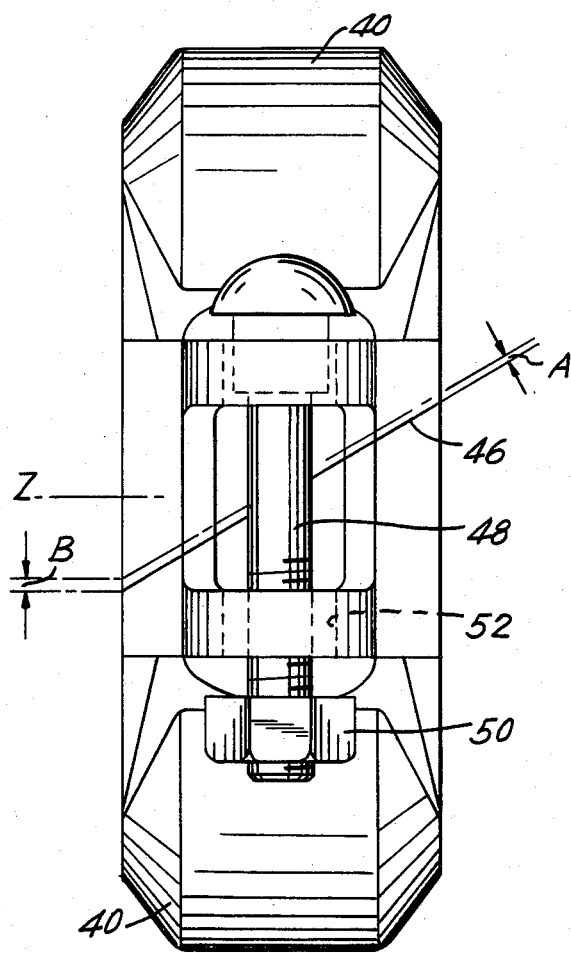
FIGS. 10 and 11 are side elevations of a coupling assembled from a pair of coupling segments as shown in FIG. 9, FIG. 10 illustrating the coupling prior to tightening down of the bolts, and FIG. 11 illustrating the coupling subsequent to the tightening down of the bolts and the consequential movement between the respective coupling segments.

As is illustrated in FIG. 10, upon assembly of the coupling from two of the coupling segments 40 of FIG. 9, and using track bolts 48 and nuts 50 in manner previously described, the end faces 46 are brought into proximity or into face engagement with each other with the respective coupling segments 40 enclosing and imprisoning the gasket [not shown]. In the event that the pipe ends are of diameter falling within the range of tolerances, the respective bolting faces 46 will engage each other in parallelism and in face engagement, and the possibility of extrusion of the gasket at the bolting faces is precluded. The coupling segments 40 in FIG. 10 are shown in the position they would occupy when the two coupling segments are aligned with each other and are not offset.

Figure 11:
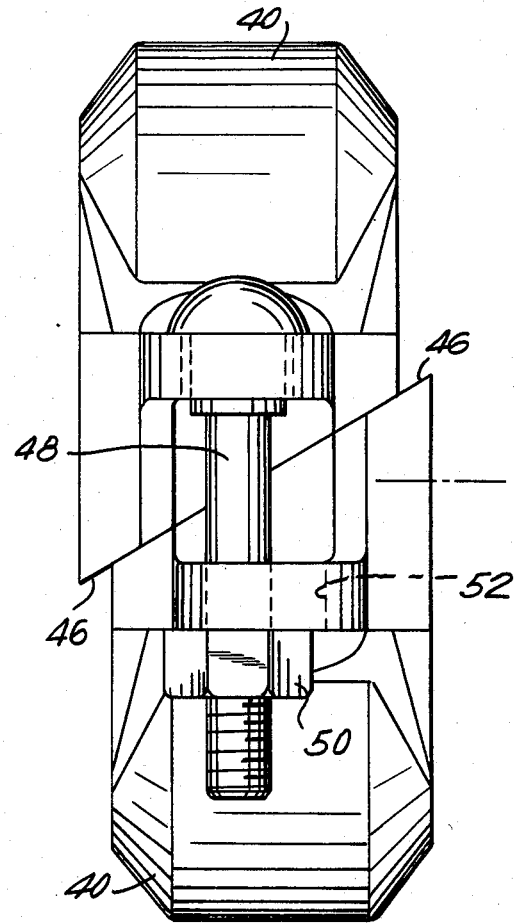

If the pipe ends are of less diameter than shown in FIG. 10 then, and as shown in FIG. 11, upon tightening down of the coupling the respective coupling segments will slide laterally of each other to an offset position until such time as the keys 42 of respective coupling segments bottom down and clamp onto the respective pipes. This offsetting of the coupling segments is permitted by the elongation of the bolt hole 52 through which the threaded shank of the track bolt 48 extends.

By permitting lateral movement of the respective coupling segments, provision is made for the reduction of the effective internal circumferential length of the inner periphery of the coupling, and, the clamping of the pipes by the coupling in the event that the pipes are undersized. Should the pipes be oversized as opposed to being undersized, then, the respective coupling segments will be slid in the opposite direction to that shown in FIG. 11. Such sliding movement will result in an increase in the effective internal circumferential length of the inner periphery of the coupling, enabling it to accommodate and clamp onto the larger pipes.

As illustrated in chain-dotted lines in FIG. 10, there is possibility that the end faces will not come into contact with each other in one or a combination of antagonistic circumstances. In the event that the coupling is applied to a pipe having an out-of-round end, or one in which the grooves have been formed of insufficient depth to accomodate the required extent of inward movement of the keys 42, or, in the case that the coupling segments are undersized, or, any combination of such circumstances, then, there is a possibility that the end faces will remain spaced from each other.

The first possibility would be overcome by the pipe end moving into round as the coupling is tightened down. The other two possibilities would not, however, be overcome and a gap as shown at A in FIG. 10 would be present between the end faces of the coupling segments in the fully tightened down condition of the coupling. Such a gap is to be avoided, in that it could possibly permit gasket extrusion and require the use of an extrusion shield. This possibility of gasket extrusion even in the presence of a gap is, however, significantly minimized by orienting the end faces in an inclined position relative to the X-Z plane of the coupling. In this orientation, the width of the gap A in a direction perpendicular to the end faces 46 is substantially less than the width of the gap when measured in the X-Y plane of the coupling as indicated at B in FIG. 10. The gap B represents the spacing of the end faces of the bolting pads as it would appear in a coupling having end faces that extend parallel to the X-Z plane. As the probability of gasket extrusion is reduced in relationship to a reduction in the width of the gap B, and as the gap A is of lesser width than the gap B, the possibility of gasket extrusion in the antagonistic circumstances mentioned above is significantly reduced, thus reducing or eliminating the necessity to employ extrusion shields.

As the bolting faces 46 act to force offsetting of the respective coupling segments in the direction of the Z axis, the possibility exists of moving the keys 42 of one of the coupling segments into engagement with one of the radial walls of the grooves in the pipe ends, while at the same time moving the keys 42 of the other coupling segment into engagement with the opposite radial wall of the grooves in the pipe ends, thus further immobilizing the pipes against relative movement.

Figure 12:
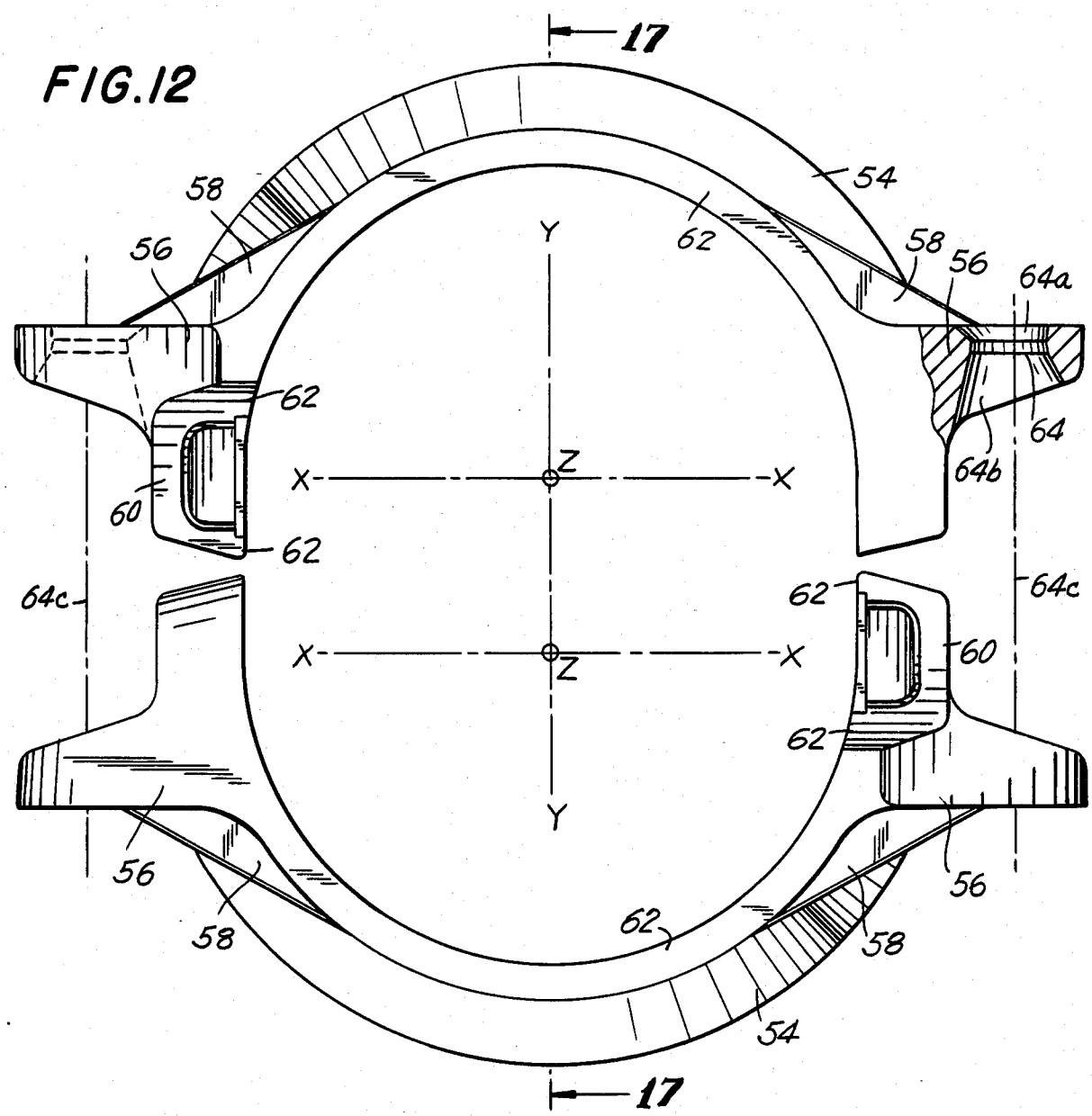
FIG. 12 is a front elevation of two coupling segments of another embodiment of pipe coupling of the present invention in a position ready for assembly to each other.
Figure 13:
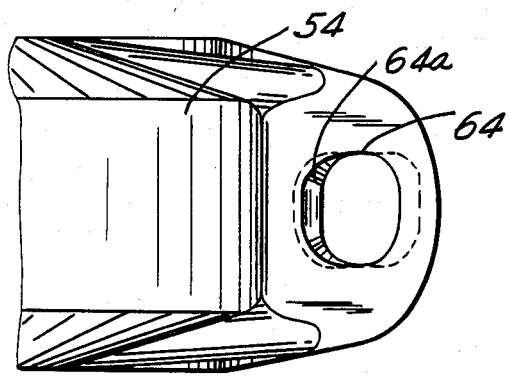
FIGS. 13 and 14 are respectively a top plan view and an underside plan view of the bolting pad illustrated in a cross-section in FIG. 12.
Figure 14:
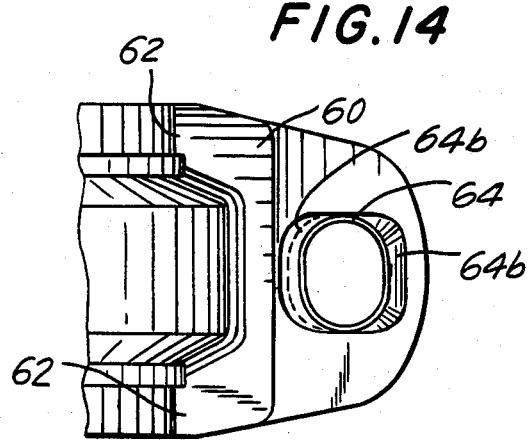

In FIGS. 9 through 11, the end faces are co-planar for them to produce bodily movement or offsetting of the respective coupling segments in directions axially of the pipe ends without skewing of the coupling segments. FIGS. 12 through 18 illustrate another embodiment of coupling in which the advantage of offsetting of the coupling members is provided, as in the embodiment of FIGS. 9 through 11, and additionally provision is intentionally made for rotation of the respective coupling segments in opposite directions about the Y axis. In FIG. 12, the respective coupling segments 54 are provided with bolting pads 56, which, as previously described are provided with buttresses 58. The respective bolting pads have end faces 60 which extend perpendicular to the Y-Z plane of the coupling, and which are inclined at an angle in the order of 30 degrees to the diametral X-Z plane of the coupling, but, which are oppositely inclined relative to that plane.

Upon assembly of a coupling from two of the coupling segments 54, and, as more clearly shown in FIGS. 16 and 17, the end faces at one side of the coupling will move axially and become offset (FIG. 16), while at the same time the end faces 60 at the opposite side of the coupling will move axially in the opposite direction (FIG. 17) and become offset. In this manner, the coupling segments are deliberately rotated about the Y axis for them to be inclined oppositely relative to the X-Y plane of the coupling, i.e., the plane perpendicular to the longitudinal axis of the pipes. As a consequence, the effective internal circumferential length of the inner periphery of the coupling can be increased or decreased as required in order to accommodate oversized or undersized pipes while at the same time skewing the keys 62, such that the ends thereof move oppositely in directions parallel to Z axis, and move into abutment at their ends with the respective opposite radial walls of the pipe grooves.

A modification of the bolt receiving apertures in the bolting pads 56 is illustrated in FIGS. 12 through 15, that modification finding equal applicability in the embodiments of FIGS. 1 through 11, and, the embodiment later described with respect to FIGS. 19 and 20.

In FIGS. 11 through 15, the bolt receiving apertures 64 are formed with axially extending outwardly diverging portions 64a and 64b, which extend parallel to the Z axis, and which preferably are oriented at an angle of 30 degrees to the longitudinal axis 64c of the apertures 64. When a track bolt is inserted into the aperture 64, instead of being guided close to the longitudinal axis of the aperture and held aligned with the longitudinal axis within relatively close limits, the track bolt can swing within the 30 degrees extent of the flared aperture portions 64a and 64b, to opposite sides of the axis of the apertures, as indicated by the chain dotted lines in FIG. 14.

The resulting swinging movement facilitates the assembly of the respective coupling segments 54 over the pipe ends and over a gasket positioned on the pipe ends, ready for the insertion of a bolt through the opposite pair of bolting pads, and, the subsequent torquing down of the nuts to tighten the coupling. The flaring of the portions 64a and 64b in no way affects the correct positioning of the track bolt in its required orientation, lateral shifting of the track bolt relative to the bolting pad 56 being precluded by the correctly dimensioned aperture 64 itself.

Figure 20:
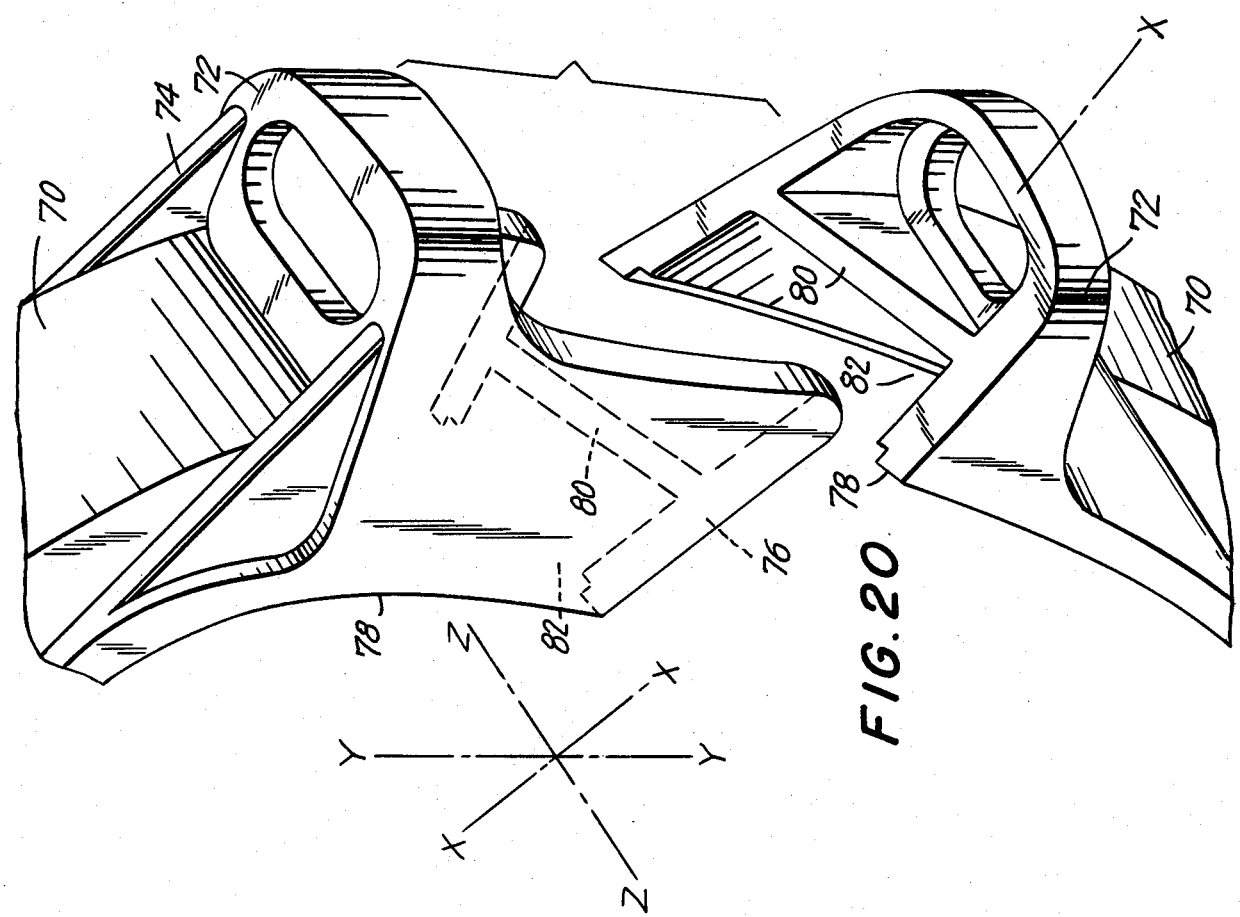
FIG. 20 is a fragmentary perspective view of the bolting pads of FIG. 19.
Figure 18:
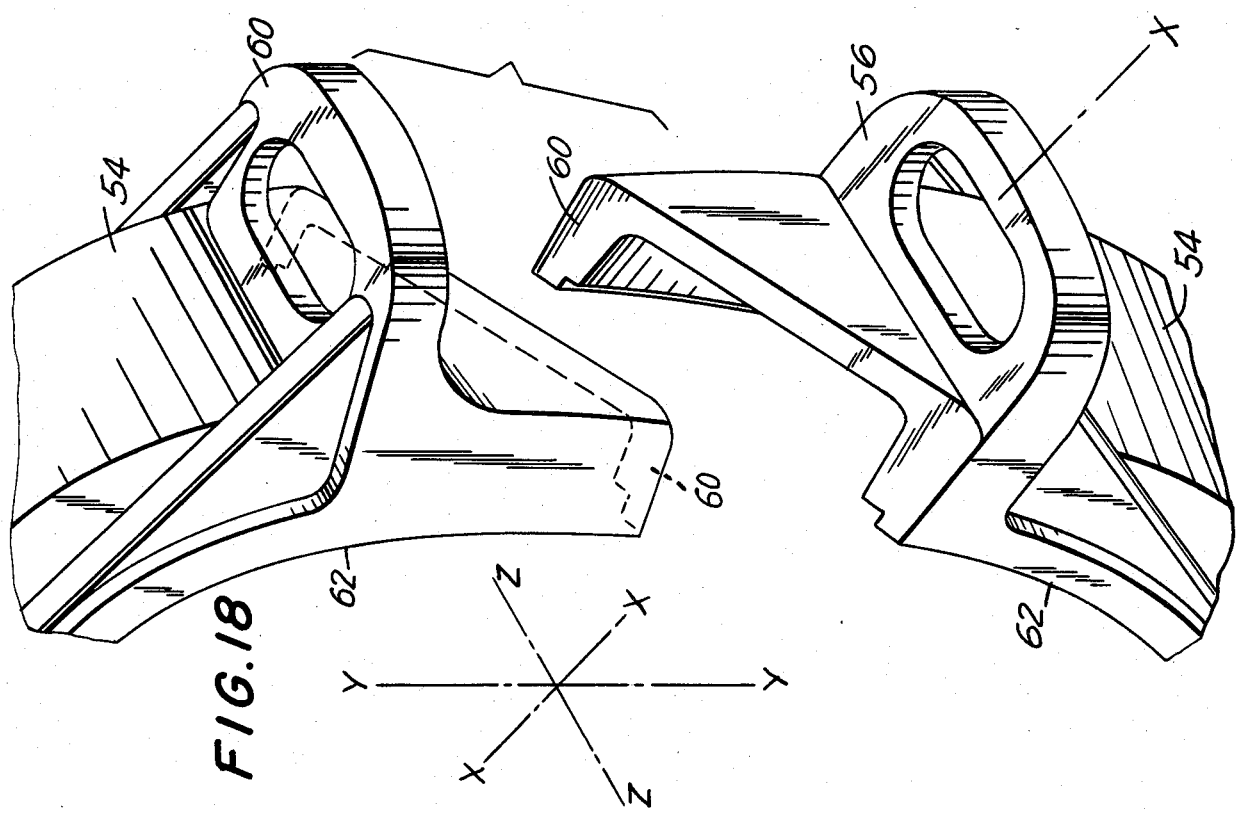
FIG. 18 is a fragmentary perspective view of the bolting pads of FIGS. 12 through 17.
Figure 23:
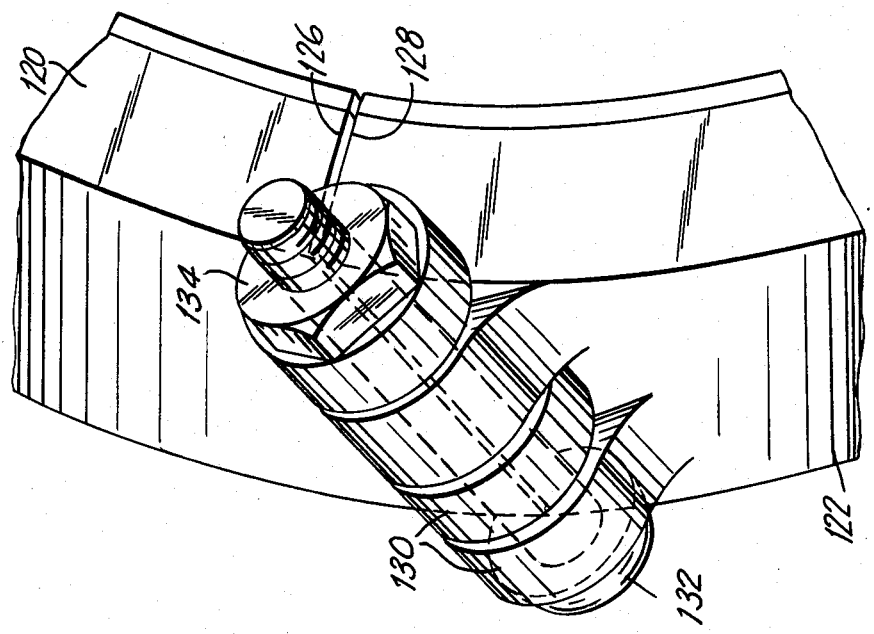
FIG. 23 is a perspective view of FIG. 22.
Figure 22:
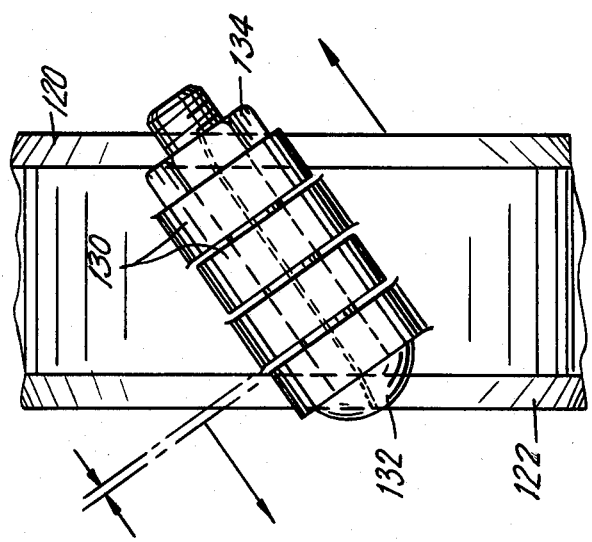
FIG. 22 illustrates a hinge incorporating the inclined end faces of the present invention.

Referring now to FIGS. 19 and 20 an embodiment of the coupling is shown which combines the features of the coupling of FIGS. 3 and 4, and also those of the coupling FIGS. 12 through 18.

In FIG. 19, the respective coupling segments 70 are provided with bolting pads 72, the bolting pads having reinforcing buttresses 74, end faces 76, and keys 78. The end faces 76 are each planar, and, in addition to being oppositely inclined relative to the Z axis, and also are inclined relative to the X axis.

The respective bolting faces 76 each include a central gasket confining wall 80 providing a gasket receiving channel 82 for confining a gasket.

Upon assembly of the coupling by the use of track bolts as previously described, in addition to the respective bolting pads being able to move oppositely in a plane inclined to the X-Z plane and to move laterally and rotate about the Y axis, as discussed with respect to the embodiment of FIGS. 12 through 18, the respective bolting pads can also move oppositely in a plane inclined to the X-Z plane and laterally of the longitudinal X axis of the coupling in the manner discussed with respect to FIGS. 3 and 4 to bring the respective keys into engagement with the groove walls. Additionally, one of the bolting pads of one of the coupling segments 70 is urged in the direction of the X axis and into engagement with the outer surface of the pipe or the bottom wall of the pipe groove, while the other bolting pad acts to urge the juxtaposed bolting pad in an opposite direction of the X axis and into clamping engagement with the pipe end or the bottom wall of the pipe groove.

In this manner, lateral offsetting of the respective pairs of bolting pads in the direction of the Z axis is accomplished, while at the same time rotation of the respective pairs of bolting pads about the Y axis is provided, and, in addition, radial offsetting of the respective pairs of bolting pads relative to the X axis is provided in order to immobilize the pipes to the greatest possible extent.

Throughout these combined movements of the bolting faces 76, the bolting faces remain in face contact with each other, and, the central ribs 80 inhibit extrusion of the gasket when under compression.

While throughout the description of the preferred embodiments reference has been made to couplings comprised of two coupling segments, it will be appreciated that the coupling may be comprised of three or more such segments arranged in end-to-end relationship for them collectively to encircle the pipe ends. In such arrangements it may be desirable to include stops to preclude over-tightening at any one of the interfaces which might otherwise result in a gap at one of the interfaces. An example of a stop is shown as 30a in FIG. 1.

In such an embodiment of coupling, the respective end faces of the bolting pads may take any one of the forms described above with respect to the drawings, or, may be a combination of the various different ones of those forms. Optionally, some of the coupling segments could be hinged to each other in a conventional manner, the inclined end faces being provided on the end-most coupling segments of the assembly.

Instead of being substantially planar, as previous described, the bolting pads of the embodiments of FIGS. 9 through 20 can be so formed that the track bolts forceably assist in the lateral offsetting of the coupling segments relative to each other. Such an embodiment is illustrated in FIG. 21, in which the respective coupling segments 100 are provided with end faces 102 which are inclined relative to the diametral X-Z plane of the coupling, the bolting pads 104 having bosses 106 formed thereon having bolting faces which are inclined to the said diametral X-Z plane of the coupling, and which also are inclined relative to the end faces 102. In this embodiment, upon insertion and torquing down of the track bolt 108, resultants of the clamping force will act in the plane of the inclined end faces 102 to force relative sliding movement between those faces, and, to force offsetting of the respective coupling segments, and clamping engagement of the coupling segments with the radial walls of the pipe grooves.

FIGS. 22 through 25 illustrate a modification of the bolting pads of the previous figures, and which advantageously can be used in the manner of a hinge, while at the same time retaining the advantages previously discussed with respect to the inclined end faces.

In FIGS. 22 through 25, the respective coupling segments 120, 122 each define a gasket receiving channel 124, and terminate in complementary inclined end faces 126, 128, as previously described in reference to FIGS. 9 through 18. The adjacent ends of the coupling segments each are formed with lugs 130 having nose portions which extend circumferentially beyond the end faces 126, 128, and which extend perpendicular to the planes of the respective end faces 126 and 128.

The respective lugs 130 are interfitted, and are of lesser width than the spacing between the lugs within which they are interfitted, the respective lugs being secured to each other by a bolt 132 extending through aligned bores in the lugs. The head of the bolt 132 reacts against an end most lug associated with one of the coupling segments (the coupling segment 122), and a nut 134 threaded onto the bolt 132 reacts against an end most lug associated with the other coupling segment (the coupling segment 120).

The axis of the bolt lies in the plane of the end faces 126, 128, thus permitting hinging of the coupling segments about the axis of the bolt, and, permitting sliding movement between the respective end faces 126, 128. Upon torquing down of the nut 134, the lug 130 associated with the coupling segment 120 is forced to slide leftwardly, along the bolt, while simultaneously the head of the bolt acts to force the lug 130 associated with the coupling segment 122 rightwardly to slide the end faces 126, 128 in opposite directions relative to each other, and, to reduce to effective internal circumferential length of the inner periphery of the coupling for the reasons previously described, and in the manner previously described.

Referring particularly to FIG. 24, such a hinge construction has the advantage of providing a swing-over connection between the respective coupling segments, thus allowing one of the coupling segments to be positioned over a gasket positioned on the pipe ends, and then the other segment to be swung laterally over the gasket towards the closed position of the coupling. The opposite end of the coupling then would be closed by means of bolting pads as previously described.

Alternatively, both ends of the coupling can be provided with interfitting inclined lugs having bores arranged with their axes in the plane of the associated end face, and, the coupling closed by an appropriate removable traction mechanism, such as toggle mechanism, reacting against the lugs, and which permits the lugs to be drawn into interengagement with each other to permit insertion of the bolt 132. FIG. 25 illustrates in chain-dotted lines 130a a suitable configuration of the lugs to permit the use of such a toggle mechanism or other suitable form of traction mechanism.

While the various embodiments of the invention have been described with reference to the use of track bolts for securing the coupling members to each other and providing for the required offsetting clamping action, it will be appreciated that any suitable form of traction mechanism could be employed in substitution for track bolts. One such mechanism is illustrated in FIG. 26, in which the coupling segments 110 each are provided with radially extending traction lugs 112. One of the lugs is an engaged by a pin 114 carrier by a yoke 116 having arms 118 and a bridging portion 120. The bridging portion 120 has a threaded bore in which a machine bolt 122 is received, the end of the bolt 122 reacting against the lug 112 of the other coupling segment. Numerous other forms of traction mechanism could be employed, including an appropriate toggle linkage hinged or otherwise secured to one of the lugs 112 and reacting against the other of the lugs.

In the embodiments described above, the gasket has been omitted for the sake of clarity of illustration. A typical gasket 140 and its position within the coupling segments is illustrated in FIG. 17, as is its relationship to the pipe ends 142, 144, and, the relationship 62 of the keys of the coupling segments to the grooves in the pipe ends. As an alternative to the gasket 140, O-rings received within grooves in the coupling segments can be employed. Other sealing means may also be employed as specific applications require. While a single groove is shown in each of the pipe ends, it will be appreciated that multiple grooves, either in cylindrical or fir-tree arrangement could be provided in the pipe ends, and, the respective coupling segments be provided with appropriate multiple keys. Further, it will be readily appreciated that instead of grooving the pipe ends as illustrated in FIGS. 17, the pipe ends could be beaded or have abutment members secured thereto, and, the keys clamp behind the beads or abutments and directly onto the outer periphery of the pipes. The pipes also can be plain ended and the coupling segments clamped directly on to the pipes.

While not illustrates, the end faces of the bolting pads of FIGS. 8 through 19 also can be formed in the manner illustrated and described with respect to FIGS. 6 and 7 of the drawings. In such case, the end faces would be formed for them to accommodate the expected directions of relative movement between the juxtapopsed ends of the coupling segments, either axially in relation to the Z axis, radially in relation to the X axis, or in a combination of those directions in relation to the X-Z plane of the coupling.

By providing for skewing and offsetting of the gasket segments, the utility of the coupling is extended to its use in clamping onto the ends of pipes of different diameter within the range of manufacturing tolerances, namely, one pipe which is oversized, and another pipe which is undersized with respect to the standard dimension.

It will be appreciated that various other combinations may be made of the couplings described with respect to the preferred embodiments without departing frm the scope of the appended claims, and, that such variations and modifications are to be considered as included within the scope of the appended claims.

What is claimed is:

1. In a pipe coupling of the type including plural arcuate coupling segments, radially inwardly extending engagement means on each said coupling segment for clamping engagement with ends of pipe members arranged in juxtaposed relationship, radial and axial walls of each said coupling segment providing for the reception of sealing means, and means for securing said coupling members to each other in end-to-end encircling relationship about said pipes, the improvement comprising:

juxtaposed end faces on at least one pair of adjacent coupling segments positioned in sliding face engagement with each other, said end faces each being inclined at an oblique angle to the diametral X-Z plane of the coupling and extending perpendicular to the Y-Z plane of the coupling, said end faces being positioned in at least closely proximal relationship to each other upon initial assembly of the coupling onto a pipe having an external diameter which is a maximum diameter within a range of manufacturing tolerances of said pipes; and, traction means operative to urge said end faces towards each other and then to slide said end faces across each other to reduce an effective internal circumferential length of an inner periphery of said coupling, thus permitting said engagement means to clamp onto and secure a pipe having an external diameter falling within said range of manufacturing tolerances.

2. The pipe coupling of claim 1, in which said juxtaposed end faces are planar.

3. The pipe coupling of claim 1, in which said juxtaposed end faces inter-fit, and comprise at least one surface formed by translating a profile along a reference line extending parallel to the Y-Z plane and oblique to the X-Z plane.

4. The pipe coupling of claim 1, in which each end of each said coupling segment is formed with said inclined juxtaposed end faces.

5. The pipe coupling of claim 4, in which said juxtaposed end faces are inclined in the same direction relative to said X-Z plane.

6. The pipe coupling of claim 4, in which said juxtaposed end faces are oppositely inclined relative to said X-Z plane.

7. In a pipe coupling of the type including plural arcuate coupling segments, radially inwardly extending engagement means on each said coupling segment for clamping engagement with ends of pipe members arranged in juxtaposed relationship, radial and axial walls of each said coupling segment providing for the reception of sealing means, and means for securing said coupling segments to each other in end-to-end encircling relationship about said pipes, the improvement comprising:

juxtaposed end faces on at least one pair of adjacent coupling segments positioned in sliding face engagement with each other, said end faces each being inclined at an oblique angle to the diametral X-Z plane of the coupling, said end faces each being inclined at an oblique angle to the Z axis, and also being inclined at an oblique angle to the X axis, said end faces being positioned in at least closely proximal relationship to each other upon initial assembly of the coupling onto a pipe having an external diameter which is a maximum diameter within a range of manufacturing tolerances of said pipe; and, traction means operative to urge said end faces towards each other and then to slide said end faces across each other to reduce an effective internal circumferential length of an inner periphery of said coupling, thus to permit said engagement means to clamp onto and secure a pipe having an external diameter falling within said range of manufacturing tolerances.

8. The pipe coupling of claim 7, in which said juxtaposed end faces are planar.

9. The pipe coupling of claim 7, in which said juxtaposed end faces inter-fit and comprise at least one surface formed by translating a profile along a reference line extending oblique to said X, Y and Z axis.

10. The pipe coupling of claim 7, in which each end of each said coupling segment is formed with said inclined juxtaposed end faces.

11. The pipe coupling of claim 10, in which said juxtaposed end faces are inclined in the same direction relative to said X-Z plane.

12. The pipe coupling of claim 10, in which said juxtaposed end faces are oppositely inclined relative to said X-Z plane.

13. The pipe coupling of claim 1, in which said securing means include abutment members on adjacent coupling segments, and a traction member interconnecting said abutment members for closing said coupling, said traction member being comprised by a yoke having spaced parallel links interconnected by a transverse pin at one of their ends and interconnected by a bridge at the other of their ends, the pin being engaged with an abutment member of one of said coupling segments, and the bridge having a bolt threaded therethrough and which is engaged with an abutment member of the other of said coupling segments.

14. The pipe coupling of claim 1, in which each end of each said coupling segment is provided with said inclined juxtaposed end faces, at least one of said securing means comprising spaced inter-fitting lugs oriented in planes perpendicular to said end faces, and which are connected to each other by a traction bolt having its longitudinal axis extending parallel to the plane of said end faces.

15. The pipe coupling of claim 14, in which each end of each said coupling segment is provided with said inclined lugs.

16. The pipe coupling of claim 15, in which said lugs provide positioning and reaction members for a removable traction means usable in closing the coupling and aligning the bores in the respective lugs to permit insertion of said traction bolt.

17. The pipe coupling of claim 7, in which said securing means include abutment members on adjacent coupling segments, and a traction member interconnecting said abutment members for closing and coupling, said traction member being comprised by a yoke having spaced parallel links interconnected by a transverse pin at one of their ends and interconnected by a bridge at the other of their ends, the pin being engaged with an abutment member of one of said coupling segments, and the bridge having a bolt threaded therethrough and which is engaged with an abutment member of the other of said coupling segments.

18. The pipe coupling of claim 7, in which each end of each said coupling segment is provided with said inclined juxtaposed end faces, at least one of said securing means comprising spaced inter-fitting lugs oriented in planes perpendicular to said end faces, and which are connected to each other by a traction bolt having its longitudinal axis extending parallel to the plane of said end faces.

19. The pipe coupling of claim 18, in which each end of each coupling segment is provided with said inclined lugs.

20. The pipe coupling of claim 19, in which said lugs provide positioning and reaction members for a removable traction means usable in closing the coupling and aligning the bores in the respective lugs to permit insertion of said traction bolt.

21. The pipe coupling of claim 1 in which said traction means are bolts engaged with radially extending bolting pads at the respective ends of the coupling segments.

* * * * *